US008044130B2

(12) United States Patent
Miyamoto et al.

(10) Patent No.: US 8,044,130 B2
(45) Date of Patent: *Oct. 25, 2011

(54) SURFACE-COATED FLAME-RETARDANT PARTICLE AND METHOD OF PRODUCING THE SAME, AND FLAME-RETARDANT RESIN COMPOSITION AND METHOD OF PRODUCING THE SAME

(75) Inventors: Tsuyoshi Miyamoto, Minamiashigara (JP); Masayuki Okoshi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 625 days.

This patent is subject to a terminal disclaimer.

(21) Appl. No.: 11/178,344

(22) Filed: Jul. 12, 2005

(65) Prior Publication Data

US 2006/0293415 A1  Dec. 28, 2006

(30) Foreign Application Priority Data

Feb. 24, 2005 (JP) ................. 2005-049010

(51) Int. Cl.
*C08K 13/06* (2006.01)
*C08K 9/04* (2006.01)
*C08K 3/00* (2006.01)
*B32B 5/16* (2006.01)

(52) U.S. Cl. ........ 524/436; 524/430; 524/437; 523/200; 523/205; 523/212; 252/610; 428/407

(58) Field of Classification Search ................. 523/200, 523/212, 205; 524/128, 404, 418, 430, 431, 524/463, 493, 504, 124, 117, 119, 492, 436, 524/437; 427/212; 252/610; 428/407
See application file for complete search history.

(56) References Cited

U.S. PATENT DOCUMENTS

| 4,105,465 A | 8/1978 | Berger |
| 4,151,154 A | 4/1979 | Berger |
| 4,283,316 A | 8/1981 | Bonsignore |
| 4,769,179 A | 9/1988 | Kato et al. |
| 4,791,160 A | 12/1988 | Kato et al. |
| 4,983,663 A | 1/1991 | Orikasa et al. |
| 5,284,889 A | 2/1994 | Pyun et al. |
| 5,401,442 A | 3/1995 | Miyata |
| 5,532,302 A | 7/1996 | Nakanishi et al. |
| 5,571,526 A | 11/1996 | Miyata |
| 5,583,172 A | 12/1996 | Imahashi et al. |
| 5,643,980 A | 7/1997 | Shindoh et al. |
| 5,665,155 A * | 9/1997 | Hohner et al. ........... 106/287.14 |
| 5,744,516 A | 4/1998 | Hashitani et al. |
| 5,766,568 A | 6/1998 | Kurisu et al. |
| 5,827,906 A | 10/1998 | Metzemacher et al. |
| 6,291,570 B1 * | 9/2001 | Katsuki et al. ................. 524/434 |
| 6,444,315 B1 | 9/2002 | Barfurth et al. |
| 6,469,095 B1 | 10/2002 | Gareiss et al. |
| 6,682,801 B2 | 1/2004 | Imahashi et al. |
| 6,746,640 B2 | 6/2004 | Weberg et al. |
| 6,755,995 B1 | 6/2004 | Hasegawa et al. |
| 6,797,386 B2 | 9/2004 | Yabui et al. |
| 6,831,120 B1 * | 12/2004 | Zobel et al. .................... 524/124 |
| 6,858,300 B2 | 2/2005 | Kinose et al. |
| 7,084,197 B2 * | 8/2006 | Chin et al. ....................... 524/99 |
| 7,695,651 B2 | 4/2010 | Matsumura et al. |
| 2001/0044488 A1 | 11/2001 | Yasuda et al. |
| 2003/0039671 A1 | 2/2003 | Tournilhac et al. |
| 2003/0083442 A1 | 5/2003 | Nishihara et al. |
| 2003/0104743 A1 | 6/2003 | Weberg et al. |
| 2003/0235693 A1 | 12/2003 | Oishi et al. |
| 2004/0076805 A1 | 4/2004 | Oohori et al. |
| 2004/0106709 A1 | 6/2004 | Toshimitsu et al. |
| 2004/0138378 A1 | 7/2004 | Takagi |
| 2005/0113500 A1 * | 5/2005 | Okoshi et al. ................. 524/405 |
| 2006/0214143 A1 * | 9/2006 | Okoshi et al. ................. 252/609 |
| 2006/0217462 A1 * | 9/2006 | Hoshio et al. ................. 523/458 |
| 2006/0293415 A1 | 12/2006 | Miyamoto et al. |
| 2007/0173563 A1 * | 7/2007 | Okoshi et al. ................. 523/200 |
| 2007/0249756 A1 * | 10/2007 | Okoshi et al. ................. 523/205 |
| 2008/0039556 A1 | 2/2008 | Ikezawa et al. |

FOREIGN PATENT DOCUMENTS

| CA | 2 335 948 A1 | 1/2000 |
| CN | 1536000 A | 10/2004 |
| DE | 198 28 536 A1 | 12/1999 |
| DE | 199 23 625 A1 | 11/2000 |
| EP | 1 160 279 A1 | 12/2001 |
| EP | 1528083 A1 * | 4/2005 |
| EP | 1 528 083 A1 | 5/2005 |
| EP | 1 695 993 A1 | 8/2006 |
| EP | 1 705 213 A1 | 9/2006 |
| JP | A 52-30262 | 3/1977 |
| JP | A 57-145006 | 9/1982 |

(Continued)

OTHER PUBLICATIONS

XP-002348365, Abstract of CN, Jun. 2003.
Z. Zejiang et al., "Advances in Fire-Retardant Inorganic Nanomaterials", Progress in Chemistry, vol. 16, No. 4, Jul. 2004 pp. 508-511.
Okoshi; "Processing and Flameretardancy of Novel organic-inorganic Nanocomposite"; Kyoto Institute of Technology, No. kou-305, Feb. 18, 2004; with partial translation.
XP-002348365.
Mar. 31, 2010 Office Action issued in U.S. Appl. No. 11/187,961.
May 26, 2011 Office Action issued in U.S. Appl. No. 10/973,337.
May 10, 2011 Office Action issued in Japanese Patent Application No. 2005-049010 (with translation).
Sep. 7, 2010 Office Action issued in U.S. Appl. No. 11/242,026.

(Continued)

*Primary Examiner* — Vasu Jagannathan
*Assistant Examiner* — Hannah Pak
(74) *Attorney, Agent, or Firm* — Oliff & Berridge, PLC

(57) ABSTRACT

A surface-coated flame-retardant particle comprising a flame-retardant grain and a coated layer provided on a surface of the flame-retardant grain, wherein the coated layer comprises an organic compound or a polysilicone, the flame-retardant grain comprises a metal hydrate and has a volume average particle diameter of 1 to 500 nm, and the metal hydrate comprises Mg and at least one of Ca, Al, Fe, Zn, Ba, Cu, and Ni. Also provided is a flame-retardant resin composition comprising the surface-coated flame-retardant particle.

21 Claims, No Drawings

FOREIGN PATENT DOCUMENTS

| | | |
|---|---|---|
| JP | A 61-268763 | 11/1986 |
| JP | A-5-202280 | 8/1993 |
| JP | A-05-255532 | 10/1993 |
| JP | A-06-041441 | 2/1994 |
| JP | A-6-322276 | 11/1994 |
| JP | A-07-286101 | 10/1995 |
| JP | A-09-100121 | 4/1997 |
| JP | A-10-245456 | 9/1998 |
| JP | A-11-172063 | 6/1999 |
| JP | A-11-343400 | 12/1999 |
| JP | A-2000-191844 | 7/2000 |
| JP | A-2000-264935 | 9/2000 |
| JP | A-2001-152033 | 6/2001 |
| JP | A-2001-261848 | 9/2001 |
| JP | A-2001-311011 | 11/2001 |
| JP | A-2001-323169 | 11/2001 |
| JP | A-2002-30200 | 1/2002 |
| JP | A-2002-285162 | 10/2002 |
| JP | A-2003-64185 | 3/2003 |
| JP | A 2003-92207 | 3/2003 |
| JP | A 2003-509523 | 3/2003 |
| JP | A 2003-517488 | 5/2003 |
| JP | A-2003-192874 | 7/2003 |
| JP | A-2003-226681 | 8/2003 |
| JP | 2003253266 A * | 9/2003 |
| JP | A 2003-253266 | 9/2003 |
| JP | A-2004-27079 | 1/2004 |
| JP | A-2004-250500 | 9/2004 |
| WO | WO 99/41299 | 8/1999 |
| WO | WO 00/00541 | 1/2000 |
| WO | WO 01/18117 A1 | 3/2001 |
| WO | WO 2004/050551 A1 | 6/2004 |
| WO | WO 2004/074361 A1 | 9/2004 |

* cited by examiner

SURFACE-COATED FLAME-RETARDANT PARTICLE AND METHOD OF PRODUCING THE SAME, AND FLAME-RETARDANT RESIN COMPOSITION AND METHOD OF PRODUCING THE SAME

CROSS-REFERENCE TO RELATED APPLICATION

This application claims priority under 35 USC 119 from Japanese patent Application No. 2005-049010, the disclosure of which is incorporated by reference herein.

BACKGROUND OF THE INVENTION

1. Field of the Invention

The present invention relates to a surface-coated flame-retardant particle, a flame-retardant resin composition using the same, and methods of producing the same. In particular, the present invention relates to a surface-coated flame-retardant particle and a flame-retardant resin composition using the same that are used for protection, from the troubles by heat such as fire, of various products including frames for consumer electronics and OA products, electric wires and cables, vehicles such as automobile, ship, airplane, and railroad train, building materials, electronic devices and printed board.

2. Description of the Related Art

Halogen compounds, antimony trioxide, phosphorus compounds, hydrated metal compounds (metal hydrates) and the like have been used as flame retardants to be mixed with matrix resins (hereinafter, referred to simply as "resin") so as to impart flame-retarding property thereto. Among flame retardants, use of halogen compounds and antimony trioxide is declining because of environmental concern, but hydrated metal compounds can reduce the environmental load and are more advantageous also from the viewpoints of resin recycling.

However, the hydrated metal compound has to be used in a large amount in order to provide flame resistance equivalent to that imparted by other organic flame-retardant compounds. Therefore, use of a large amount of the hydrated metal compound results in drastic deterioration of the physical properties of the polymer. In order to impart flame resistance equivalent to that imparted by other organic flame retardants without deterioration of the physical properties of the polymer, it is necessary to disperse hydroxylated metal compound particles with a small diameter in a matrix resin uniformly such that they are separated from each other without aggregation. Thus, when metal hydrate particles are mixed in a resin, it is necessary to form a uniform coating layer on the particle surface, so as to ensure the dispersion state of the particles in the matrix resin.

Surface treatment with a higher fatty acid or the like, formation of a silica layer, and the like are known as methods for forming a coating layer on particle surface (for example in Japanese Patent Application Laid-Open (JP-A) Nos. 52-30262 and 2003-253266, the disclosures of which are incorporated herein by reference). However, when such methods are applied to nanometer-sized particles, the particle in the aggregated state undergoes coating reaction under conventional reaction conditions because the particles are difficult to disperse sufficiently and the coating reaction rate is high; as a result, uniformly coated particles are not obtained.

Further, it has been proposed to treat surface of inorganic powder with a polyamino acid or a gas-phase cyclic organosiloxane (for example in JP-A Nos. 57-145006 and 61-268763, the disclosures of which are incorporated herein by reference). These methods also resulted in insufficient dispersion of the particles and generation of aggregates when applied to nanometer-sized particles.

A method of preparing fine particles enclosed with a linear polymer by mixing and reacting an organic metal complex or the like with the linear polymer in a solvent has been also proposed (for example in JP-A No. 2003-92207, the disclosure of which is incorporated herein by reference). The method provides uniform particles owing to stabilization of the organic metal complex by the linear polymer and owing to controlled reactivity of the organic metal complex. However, the method has a problem that when the reaction proceeds in the three-dimensional supermolecular structure, it is difficult to obtain particles having a uniform particle diameter due to unevenness of the reaction field caused by higher spatial freedom inside the linear polymer network.

Further, polymer nanocomposite compositions of a polyamide and a modified silicate salt, graft polymers, polycarbonate blends containing a phosphonate amine and inorganic nanoparticles, and the like have been also proposed recently for imparting flame-retarding property to resins by using fine particles (for example in Japanese Patent Application National Publication Nos. 2003-517488 and 2003-509523 (corresponding to WO99/041299 and WO01/018117), the disclosures of which are incorporated herein by reference). However, none of these compositions can solve the problems above when used as a flame retardant.

SUMMARY OF THE INVENTION

In conventional techniques, flame-retarding property is imparted to a resin by using flame-retardant particles having a diameter in the range of 1 to 50 μm in an amount of as great as approximately at least 50 to 150 parts by weight per 100 parts by weight of the matrix resin. Use of the particles in such a great amount often resulted in degradation of the mechanical and electrical properties of the resin, and thus, for example, other additives or resins are blended for prevention of such degradation.

The inventors of the present invention have conducted intensive studies in consideration of the problems described above. The studies focused on such atomization of flame-retardant particles as to increase the specific surface area of the particles and as to increase the contact area of the particles with the polymer. As the result, the inventors have found new flame-retardant particles and production methods thereof. The flame-retardant particles are surface-coated flame-retardant particles having a volume-average particle diameter in the range of 1 to 500 nm. In the flame-retardant particles, a uniform layer of an organic compound having an organic group capable of binding to inorganic fine grains or a polysilicone is provided on the surface of the inorganic fine grains. The inventors have found that, when the particles are blended in a polymer, the particles imparts, even at a lower content, a flame resistance equivalent to that imparted by a flame-retardant compound having a volume-average particle diameter of approximately 0.5 to 50 μm.

The invention provides surface-coated flame-retardant particles. Each surface-coated flame-retardant particle comprises a flame-retardant grain and a coated layer provided on the surface of the flame-retardant grain. The coated layer comprises an organic compound or a polysilicone. The flame-retardant grains comprise a metal hydrate and have a volume average particle diameter of 1 to 500 nm. The metal hydrate comprises Mg and at least one of Ca, Al, Fe, Zn, Ba, Cu, and Ni.

The invention also provides a flame-retardant resin composition comprising a matrix resin and surface-coated flame-retardant particles mixed with the matrix resin. Each surface-coated flame-retardant particle comprises a flame-retardant grain and a coated layer provided on the surface of the flame-retardant grain. The coated layer comprises an organic compound or a polysilicone. The flame-retardant grains comprise a metal hydrate and have a volume average particle diameter of 1 to 500 nm. The metal hydrate comprises Mg and at least one of Ca, Al, Fe, Zn, Ba, Cu, and Ni.

The invention also provides a method of producing surface-coated flame-retardant particles. The method comprises: forming a dispersion liquid by dispersing flame-retardant grains in an aqueous solution in which a metal salt of an organic compound and a dispersant are dissolved; and forming a coating layer by depositing the organic compound on the flame-retardant grains by adding an acidic aqueous solution to the dispersion liquid. The flame-retardant grains comprise a metal hydrate and have a volume average particle diameter of 1 to 500 nm. The metal hydrate comprises Mg and at least one of Ca, Al, Fe, Zn, Ba, Cu, and Ni.

The invention provides another method of producing surface-coated flame-retardant particles. The method comprises: forming a dispersion liquid by dispersing flame-retardant grains in a solution in which an organic compound and a dispersant are dissolved in an organic solvent miscible with water; and forming a coating layer by depositing the organic compound on the flame-retardant grains by adding water to the dispersion liquid. The flame-retardant grains comprise a metal hydrate and have a volume average particle diameter of 1 to 500 nm. The metal hydrate comprises Mg and at least one of Ca, Al, Fe, Zn, Ba, Cu, and Ni.

The invention provides another method of producing surface-coated flame-retardant particles. The method comprises: forming a dispersion liquid by dispersing flame-retardant grains in an aqueous solution in which a dispersant is dissolved; and adding an aqueous solution of a salt of a polyamino acid to the dispersion liquid to form a coating layer through deposition of the polyamino acid on the flame-retardant grains. The flame-retardant grains comprise a metal hydrate and have a volume average particle diameter of 1 to 500 nm. The metal hydrate comprises Mg and at least one of Ca, Al, Fe, Zn, Ba, Cu, and Ni.

The invention provides another method of producing surface-coated flame-retardant particles. The method comprises: forming metal soap particles having a micelle structure or a vesicle structure by dissolving a surfactant and a metal salt including Mg and at least one of Ca, Al, Fe, Zn, Ba, Cu, and Ni in water; converting the metal soap particles to reverse micelle particles by suspending the metal soap particles in an organic solvent; and forming a metal hydroxide by allowing the metal ion contained in the reverse micelle particles to react with a base.

The invention provides another method of producing surface-coated flame-retardant particles. The method comprises: forming a suspension liquid obtained by suspending a metal salt of an organic compound in an organic solvent; and forming a metal hydroxide by allowing the metal ion contained in the metal salt of the organic compound to react with a base. The metal salt of the organic compound includes Mg and at least one of Ca, Al, Fe, Zn, Ba, Cu, and Ni.

The invention provides another method of producing surface-coated flame-retardant particles. The method comprises: forming a first aqueous solution in which a dispersant or chelate compound, and a metal salt of an organic compound are dissolved; adding a second aqueous solution of a metal ion to the first aqueous solution; and forming a metal hydroxide by adding a base to the mixed aqueous solution containing the metal ion. The metal salt of the organic compound includes Mg and at least one of Ca, Al, Fe, Zn, Ba, Cu, and Ni.

The invention provides another method of producing surface-coated flame-retardant particles. The method comprises treating flame-retardant grains having a volume average particle diameter of 1 to 500 nm with vapor of a cyclic organosiloxane compound so as to allow the cyclic organosiloxane compound to undergo ring-opening polymerization on the flame-retardant grains and so as to form a coating layer on the flame-retardant grains. The flame-retardant grains comprise a metal hydrate containing Mg and at least one of Ca, Al, Fe, Zn, Ba, Cu, and Ni.

The invention also provides flame-retardant particles obtained by any of the methods described above.

The invention further provides a method of producing a flame-retardant resin composition. The method comprises: mixing at least a matrix resin and surface-coated flame-retardant particles; and kneading the mixture by using at least one kneading machine selected from rolls, a kneader, a Banbury mixer, an intermixer, a uniaxial extruder, and a biaxial extruder. The surface-coated flame-retardant particles each comprise a flame-retardant grain and a coated layer provided on the flame-retardant grain. The coated layer comprises an organic compound or a polysilicone. The flame-retardant grains comprise a metal hydrate and have a volume average particle diameter of 1 to 500 nm. The metal hydrate comprises Mg and at least one of Ca, Al, Fe, Zn, Ba, Cu, and Ni.

DESCRIPTION OF THE PREFERRED EMBODIMENTS

Hereinafter, the present invention will be described in detail.

<Surface-coated Flame-retardant Particle>

The surface-coated flame-retardant particles according to the invention comprise: flame-retardant grains comprising a metal hydrate including Mg and at least one of Ca, Al, Fe, Zn, Ba, Cu and Ni having a volume-average particle diameter in the range of 1 to 500 nm; and a coated layer including an organic compound or a polysilicone provided on the surface of the flame-retardant grains.

As described above, it is effective to form a uniform coated layer on the surface of flame-retardant grains for improving the dispersion state of the nanometer-sized flame-retardant particles in a resin. In the surface-coated flame-retardant particles according to the invention, a complex metal hydrate containing Mg and one or more metals selected from Ca, Al, Fe, Zn, Ba, Cu and Ni is used as the flame-retardant grains on which the coating layer is to be provided. Such a complex metal hydrate containing Mg metal as an essential component and additionally containing various metals is effective in improving the flame-retarding property. For example, the combination of Mg and Ni or Fe dehydrogenates the hydrocarbons derived from resin components vaporized during combustion, thus improving the flame-retarding effects of the resin composition and suppressing smoke generation. The combination of Mg and Al adjusts the water-releasing temperature during combustion, thus improving the flame-retarding effects.

In the invention, a metal hydrate containing Mg and one or more metals selected from Ca, Al, Fe, Zn, Ba, Cu and Ni is used in the flame-retardant grains. The metal hydrate is represented by the following Formula (1):

$$MgM_x\text{-}(OH)_y \qquad \text{Formula (1)}$$

In the Formula above, M represents one or more metals selected from Ca, Al, Fe, Zn, Ba, Cu and Ni; x is a real number of 0.1 to 10; and y is an integer of 2 to 32.

M is preferably Ca, Al, Fe, Zn, Ba, Cu, or Ni; and MgAlx, MgCax, MgZnx, MgFex, or Mg(Al.Ca)x is more preferable as MgMx.

The flame-retardant grains comprising the metal hydrate have a volume-average particle diameter in the range of 1 to 500 nm. The volume-average particle diameter of the flame-retardant grains is preferably in the range of 1 to 200 nm, more preferably 5 to 200 nm, still more preferably 10 to 200 nm.

A volume-average particle diameter of the flame-retardant grains of less than 1 nm may lead to reduction of the flame-resistance-retaining capacity. When the volume-average particle diameter exceeds 500 nm, the grains show property similar to that of commercially available flame-retardant particles having a volume-average particle diameter of 1 μm, and thus addition thereof in a greater amount is necessary for obtaining flame resistance.

Surface-coated flame-retardant particles using the flame-retardant grains having a volume-average particle diameter in the above range are capable of being uniformly dispersed in a resin. In addition, flame-retardant particles having a volume-average particle diameter in the nanometer order can form finer complexes, whereby a highly transparent flame-retardant resin composition can be obtained.

The organic compound described above is not particularly limited, but preferably has an organic group capable of binding to the flame-retardant grains. Binding of the organic groups enables formation of a uniform organic thin layer on the surface of the flame-retardant grains.

The organic compound preferably has, at a terminal thereof, a binding group for combining with the flame-retardant grains.

Examples of the binding group include a hydroxyl group, a phosphoric acid group, a phosphonium salt group, an amino group, a sulfuric acid group, a sulfonic acid group, a carboxylic acid group, a hydrophilic heterocyclic group, a polysaccharide group (such as sorbitol, sorbit, sorbitan, sucrose ester, and a sorbitan ester residue), a polyether group (such as a polyoxyalkylene group whose alkylene moiety has 2 to 4 carbon atoms such as polyoxyethylene or polyoxypropylene), a hydrolyzable groups (such as an alkoxy group having 1 to 4 carbon atoms such as methoxy, ethoxy, propoxy, isopropoxy, or butoxy), and a halogen atom (such as bromine or chlorine).

When the binding group is an anionic group (such as sulfuric acid group, sulfonic acid group, or carboxylic acid group), the binding group may form a salt with a base. Examples of the base include inorganic bases (e.g., an alkali-earth metal such as calcium or magnesium, an alkali metal such as sodium or potassium, and ammonia), and organic bases (e.g., amines). When the binding group is a cationic group (e.g., amino group), the binding group may form a salt with, for example, an inorganic acid (e.g., hydrochloric acid or sulfuric acid), or an organic acid (e.g., acetic acid). Further, the basic group may form a salt with an anionic group (in particular, carboxylic acid or sulfuric acid). In an embodiment, the binding group has an acidic group and a basic group.

Thus, preferable binding groups include ionic groups (anionic groups and cationic groups) and hydrolyzable groups, and the bond between the binding group and the flame-retardant grains may be an ionic or covalent bond.

Examples of the organic group in the organic compound include a group functioning as the hydrophobic group of a surfactant (e.g., a higher fatty acid residue, a higher alcohol residue, or an alkyl-aryl group), and a polyamino acid residue.

Examples of the higher fatty acid include a saturated fatty acid having 8 to 30 carbon atoms (preferably 10 to 28 carbon atoms, more preferably 12 to 26 carbon atoms) such as lauric acid, myristic acid, palmitic acid, arachic acid, behenic acid, rignoceric acid, cerotic acid, caprylic acid, capric acid, daturic acid, stearic acid, montanic acid, or melissic acid; and an unsaturated fatty acid having 12 to 30 carbon atoms (preferably 14 to 28 carbon atoms, more preferably 14 to 26 carbon atoms) such as elaidic acid, linolic acid, linoleic acid, linderic acid, oleic acid, gadoleic acid, erucic acid, or brassidic acid.

Examples of the higher alcohol include higher alcohol residues corresponding to the above higher fatty acid residues or the above higher fatty acids. Examples thereof include a higher fatty acid residue having 8 to 24 carbon atoms (preferably 10 to 22 carbon atoms, more preferably 12 to 20 carbon atoms) such as octyl, nonyl, dodecyl, tetradecyl, hexadecyl (cetyl), or octadecyl.

The alkyl-aryl group is preferably a combination of an alkyl group having 1 to 20 carbon atoms and an aryl group having 6 to 18 carbon atoms, more preferably a combination of an alkyl having 6 to 18 carbon atoms and an aryl group having 6 to 12 carbon atoms, particularly preferably a combination of an alkyl group having 6 to 16 carbon atoms and a phenyl group. Examples thereof include hexylphenyl, octylphenyl, nonylphenyl, decylphenyl, dodecylphenyl, isopropylphenyl, butylphenyl, amylphenyl, and tetradecylphenyl.

These hydrophobic groups may be substituted by various substituents (e.g., alkyl groups having 1 to 4 carbon atoms).

Examples of the polyamino acid include polyaspartic acid, polyglutamic acid, polyarginine, and polyglycine. Among them, acidic polyamino acids such as polyaspartic acid and polyglutamic acid are preferable.

The number-average molecular weight of the polyamino acid is preferably in the range of 10 to 10,000.

When surface-coated flame-retardant particles having a coated layer of the polyamino acid are used, plasticization of the matrix resin is less likely to occur upon mixing of the surface-coated flame-retardant particles and the matrix resin.

It is also possible to control the moldability (plasticity) and the mechanical properties of the resin by properly adjusting the coating amount of the polyamino acid layer and by properly selecting the type and amount of the acidic substance, even when the blending quantity of the metal hydroxide is the same.

The polysilicone is not particularly limited as long as it has a siloxane bond, and is preferably a polymer of a cyclic organosiloxane compound represented by the following Formula (2).

Formula (2)

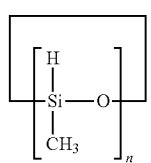

(a)

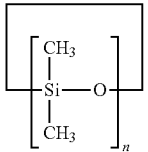

(b)

In the formula, n is an integer of 3 to 8. A polysilicone having a smaller n has a lower boiling point, and evaporates more easily, whereby the amount of the polysilicone adsorbed on the flame-retardant particle is increased. When a polysilicone has an n of more than 7, the polysilicone is less volatile and cannot achieve sufficient coating, thus being undesirable. In particular, tetramers, pentamers, and hexamers are most favorable since they are easy to polymerize owing to their three-dimensional characteristics.

The cyclic organosiloxane compound (a) or (b) shown in the formula (2) may be used in the invention. As an alternative, a combination of the cyclic organosiloxane compounds (a) and (b) may be used. The polymerization degree (number of repeating units) of the polymer is preferably in the range of 10 to 1,000, more preferably 10 to 100. In an embodiment, the coated layer comprises this polymer and the organic compound described above.

Use of a polysilicone having a lower surface energy in the coated layer suppresses plasticization of the resin when the surface-coated flame-retardant particles are mixed with a matrix resin.

In addition, when surface-coated flame-retardant particles are used in a flame-retardant resin composition, the surface polysilicone layer forms a heat-barrier layer during combustion. During combustion, water released from the metal hydrate grains accelerates foaming of the polysilicone coated layer (functioning as a heat-barrier layer) provided on the grain surface, thereby improving the heat insulating property of the heat-barrier layer and improving the flame-retarding effects.

In the invention, the amount of the organic compound (excluding polyamino acid) to be coated on the flame-retardant grains is preferably in the range of 1 to 200 wt %, more preferably 20 to 100 wt %, and still more preferably 30 to 80 wt %, with respect to the entire surface-coated flame-retardant particles. A coating amount of less than 1 wt % may lead to generation of aggregates in the matrix resin and uneven dispersion state. A coating amount of more than 200 wt % may lead to plasticization of the matrix resin when the particles are dispersed therein.

The amount of the polyamino acid or polysilicone to be coated on the flame-retardant grains is preferably in the range of 20 to 200 wt %, more preferably 20 to 80 wt %, with respect to the entire surface-coated flame-retardant particles. A coating amount of lower than 20 wt % may lead to generation of aggregates in the matrix resin and uneven dispersion state. A coating amount of more than 200 wt % may lead to plasticization of the matrix resin when the particles are dispersed therein.

The uniformity of the coating layer can be confirmed by examining the surface-coated flame-retardant particles under a transmission electron microscope.

The volume-average particle diameter (average diameter of the circumscribed circle when the surface-coated flame-retardant particles are nonspherical) of the surface-coated flame-retardant particles according to the invention is preferably in the range of 1 to 500 nm. The surface-coated flame-retardant particles more preferably have a volume-average diameter in the range approximately of 1 to 200 nm, still more preferably 5 to 200 nm, and further preferably 10 to 200 nm (particularly preferably, 10 to 100 nm).

When the volume-average particle diameter of the flame-retardant grains is less than 1 nm, the flame-resistance-retaining capacity may be reduced. When the volume-average particle diameter exceeds 500 nm, the grains show property similar to that of commercially available flame-retardant particles having a volume-average particle diameter of 1 µm, and thus addition thereof in a greater amount is necessary for obtaining flame resistance. Surface-coated flame-retardant particles having a volume-average particle diameter in the above range are capable of being uniformly dispersed in a resin. In addition, surface-coated flame-retardant particles having a volume-average particle diameter in the nanometer order can form finer complexes, whereby a highly transparent flame-retardant resin composition can be obtained.

The degree of dispersion of the surface-coated flame-retardant particles is preferably in the range of 0.1 to 3.0. The degree of dispersion is more preferably in the range of 0.1 to 1.0 particularly preferably in the range of 0.1 to 0.8.

A smaller degree of dispersion indicates a narrower particle diameter distribution of the surface-coated flame-retardant particles, i.e., more uniform distribution in particle size; and the particles having a dispersion degree in the above range give uniform flame resistance and mechanical properties when dispersed in a resin.

The volume-average particle diameter (including flame-retardant particles) and the degree of dispersion are determined by using a laser Doppler heterodyne-type particle diameter distribution analyzer (UPA, MICROTRAC-UPA150, manufactured by Nikkiso Co., Ltd.) (Measurements of volume-average particle diameters are conducted in the same manner hereinafter). Specifically, based on the measured particle diameter distribution, a volume weighted cumulative distribution of the particles is plotted against volume from the smaller particle diameter side, and the particle diameter at which the cumulative distribution reaches 50% point is assumed as the volume-average diameter. Similarly, a mass weighted cumulative distribution of the particles is plotted against particle weight from the smaller particle diameter side, and the particle diameter at which the cumulative distribution reaches 90% point is designated as $D_{90}$, and the particle diameter at which the cumulative distribution reaches 10% point is designated as $D_{10}$; the degree of dispersion is defined by Formula (1) below. Dispersion degree values are obtained in a similar manner hereinafter.

$$\text{Degree of dispersion} = \log(D_{90}/D_{10}) \quad \text{Formula (1)}$$

The method of producing the surface-coated flame-retardant particles according to the invention is not particularly limited if the configuration and the characteristics described above are satisfied. The method of producing the surface-coated flame-retardant particles described below is a preferable example of such a method.

<Method of Producing Surface-coated Flame-retardant Particles>

The methods of producing surface-coated flame-retardant particles according to the invention are roughly classified into seven methods. They are called respectively first to seventh methods of producing surface-coated flame-retardant particles according to the invention (hereinafter, referred to also as the first to seventh inventions"). The respective production methods will be described hereinafter.

(First Method of Producing Surface-coated Flame-retardant Particles)

The first method of producing surface-coated flame-retardant particles according the invention comprises: preparing a dispersion liquid by dispersing a flame-retardant grains in an aqueous solution comprising an organic compound metal salt and a dispersant, wherein the flame retardant grains comprise a metal hydrate containing Mg and one or more metals selected from Ca, Al, Fe, Zn, Ba, Cu and Ni and has a volume-average particle diameter in the range of 1 to 500 nm; and forming a coated layer by depositing the organic compound on the surface of the flame-retardant grains by adding an aqueous acidic solution to the dispersion liquid.

As described above, in order to disperse nanometer-sized flame-retardant particles in a resin, it is necessary to form a uniform coated layer on the surface of the flame-retardant grains. By the first method of producing surface-coated flame-retardant particles, it is possible to form a layer of an organic compound coated on the surface of nanometer-sized grains comprising a metal hydrate having a large surface area in a uniform and controlled manner. In the first invention, because the flame-retardant grains comprising a metal hydrate can be easily dispersed and the metal hydrate is highly stable, it is possible to heighten the productivity of the surface-coated flame-retardant particles.

Hereinafter, details of the first method of producing surface-coated flame-retardant particles will be described.

(Preparation of Dispersion Liquid)

In the first invention, flame-retardant grains comprising a specific metal hydrate are dispersed in an aqueous solution containing an organic compound metal salt and a dispersant.

An example of the organic compound metal salt is a compound having an organic group for improving dispersibility upon dispersing of the particles as the flame-retardant particles in a resin described below, wherein the organic group forms a salt with an inorganic base containing a metal via an anionic binding group (e.g., a sulfuric acid group, a sulfonic acid group, or a carboxylic acid group).

That is, the organic compound region in the organic compound metal salt has, in the organic group and/or at a terminal of the organic group, a binding region which forms a salt through a reaction with the inorganic base containing a metal.

A preferable example of the organic group in the organic compound metal salt is a hydrophobic higher fatty acid residue.

The higher fatty acid having a hydrophobic group is preferably a higher fatty acid having 8 or more carbon atoms, more preferably a saturated fatty acid having 8 to 30 carbon atoms or an unsaturated fatty acid having 12 to 30 carbon atoms. The saturated fatty acid is still more preferably a saturated fatty acid having 10 to 28 carbon atoms, particularly preferably having 12 to 26 carbon atoms. The unsaturated fatty acid is preferably an unsaturated fatty acid having 14 to 28 carbon atoms, particularly preferably an unsaturated fatty acid having 14 to 26 carbon atoms.

Typical examples thereof include: saturated carboxylic acids such as lauric acid, myristic acid, palmitic acid, arachic acid, behenic acid, rignoceric acid, cerotic acid, caprylic acid, capric acid, daturic acid, stearic acid, isostearic acid, montanic acid, and melissic acid; and unsaturated carboxylic acids such as elaidic acid, linolic acid, linoleic acid, linderic acid, oleic acid, gadoleic acid, erucic acid, and brassidic acid.

The hydrophobic groups of these acids may be substituted by various substituents (e.g., alkyl groups having 1 to 4 carbon atoms).

Among them, saturated fatty acids having 12 to 26 carbon atoms such as behenic acid, stearic acid, and isostearic acid are particularly preferable.

A polyamino acid residue is also preferable as the organic group of the organic compound metal salt.

The polyamino acid may be polyaspartic acid, polyglutamic acid, polyarginine, or polyglycine. Among them, acidic polyamino acids such as polyaspartic acid and polyglutamic acid are preferable.

The number-average molecular weight of the polyamino acid is preferably in the range of 10 to 10,000.

The metal for the inorganic base which forms a salt with the higher fatty acid or the polyamino acid is preferably an alkali-earth metal such as calcium or magnesium, or an alkali metal such as sodium or potassium; and among them, magnesium and aluminum are particularly preferable.

The dispersant described above is not particularly limited if it is soluble in water and improves dispersibility of the flame-retardant particles described below. For example, a polymer dispersant or a sodium polyphosphate is preferable. Preferable examples of the polymer dispersant include polyvinylalcohol, polyvinyl-2-pyrrolidone, polypropylcellulose, and polyacrylic acid. The molecular weight of the polymer dispersant is preferably in the range of 100 to 10,000 in terms of the volume average molecular weight equivalent in styrene. When the volume average molecular weight is less than 100, dispersion of the flame-retardant particles in the reaction solution is likely to be insufficient and the coating reaction is likely to be uneven. When the volume average molecular weight is over 10,000, aggregation of the polymer dispersant on the surface of the flame-retardant grains may occur, whereby the dispersibility of the flame-retardant grains in the reaction solution may be lowered to cause uneven coating reaction.

In the first invention, an aqueous solution containing the organic compound metal salt and the dispersant described above is prepared as the solution for use in the surface treatment of the flame-retardant grains described below. The concentration of the organic compound metal salt in the aqueous solution has to be in a specific range so as to achieve uniform coating of the entire surface of the flame-retardant grains. In the invention, the concentration of the organic compound metal salt in the aqueous solution is preferably in the range of 10 to 50 wt %. By setting the concentration of the organic compound metal salt at such a high value, it is possible to form a coating layer uniformly on the surface of the nanometer-sized grains.

The concentration of the organic compound metal salt is preferably in the range of 10 to 40 wt %. A concentration of less than 10 wt % may make it difficult to coat the organic compound uniformly on the surface of the flame-retardant grains and may lead to generation of uncoated areas. A concentration of more than 50 wt % may make it difficult to coat the organic compound uniformly on the surface of the flame-retardant grains, and may cause generation of aggregates.

In addition, the concentration of the dispersant in the aqueous solution is also preferably in a specific range from the same viewpoint as described above.

Specifically, the concentration of the dispersant is preferably in the range of 1 to 10 wt %, more preferably 1 to 5 wt %, with respect to the amount of the flame-retardant grains described below. A dispersant concentration of less than 1 wt % may lead to reduction in dispersibility of the flame-retardant grains in the reaction solution and to uneven coating reaction, while a concentration of over 10 wt % may lead to increase in the concentration of reaction solution and to uneven coating reaction.

The flame-retardant grains dispersed in the aqueous solution will be described next. The flame-retardant grains according to the invention comprise a metal hydrate containing Mg and one or more metals selected from Ca, Al, Fe, Zn, Ba, Cu and Ni. Hydrates of these metals are easy to pulverize into fine particles and are not only stable as the hydrates but also superior in the endothermic and dehydrating reactivity upon heating, whereby the hydrates show excellent flame-retarding effects.

As described above, the metal hydrate containing Mg metal as an essential component and additionally containing various metals is effective for improving the flame-retarding effects. For example, a combination of Mg and Ni or Fe dehydrogenates the hydrocarbons derived from the resin component which is vaporized during combustion, thereby improving the flame-retarding effects of the resin composition and suppressing smoke generation. A combination of Mg and Al adjusts the water-releasing temperature during combustion, thereby improving the flame-retarding effects.

The metal hydrates are represented by the following Formula (1):

$$MgM_x\text{-}(OH)_y \qquad \text{Formula (1)}$$

In the formula, M represents one or more metals selected from Ca, Al, Fe, Zn, Ba, Cu and Ni; x is a real number of 0.1 to 10; and y is an integer of 2 to 32.

M is preferably Ca, Al, Fe, Zn, Ba, Cu or Ni. In particular, $MgM_x$ is preferably $MgAl_x$, $MgCa_x$, $MgZn_x$, $MgFe_x$, or $Mg(Al.Ca)_x$.

The volume-average particle diameter of the flame-retardant grains of the metal hydrate is in the range of 1 to 500 nm. The volume-average particle diameter of the flame-retardant grains is preferably in the range of 1 to 200 nm, more preferably 5 to 200 nm, and still more preferably 10 to 200 nm.

When the volume-average particle diameter of the flame-retardant grains is less than 1 nm, the flame-resistance-retaining capacity may be reduced. When the volume-average particle diameter exceeds 500 nm, the grains show property similar to that of commercially available flame-retardant particles having a volume-average particle diameter of 1 μm, and thus addition thereof in a greater amount is necessary for obtaining flame resistance.

Surface-coated flame-retardant particles containing flame-retardant grains having a volume-average particle diameter in the above range are capable of being uniformly dispersed in a resin. In addition, flame-retardant particles having a volume-average particle diameter in the nanometer order can form finer complexes, whereby a highly transparent flame-retardant resin composition can be obtained.

The flame-retardant grains are dispersed in an aqueous solution containing the organic compound metal salt and the dispersant so that the surface of the flame-retardant grains is coated with the organic compound. In the invention, it is preferable to adjust the dispersion concentration of the flame-retardant grains within a specific range so as to achieve high productivity of the surface-coated flame-retardant particles and uniformity of coating.

The dispersion concentration is determined according to the following formula (2).

$$\text{Dispersion concentration (wt \%)} = (\text{weight of flame-retardant grains/weight of aqueous solution}) \times 100 \qquad \text{Formula (2)}$$

In the first invention, the dispersion concentration of the flame-retardant grains is preferably in the range of 0.1 to 5 wt %. By setting the dispersion concentration of the flame-retardant grains at such a low value, it is possible to form a uniform coating layer on the surface of the nanometer-sized grains.

The dispersion concentration is preferably in the range of 0.1 to 4 wt %.

When the dispersion concentration of the flame-retardant particles is less than 0.1 wt %, the productivity may be lowered though uniform coating is possible. When the dispersion concentration is over 5 wt %, aggregation is likely to occur in the dispersion and it may be difficult to conduct uniform coating.

The flame-retardant grains may be dispersed in the aqueous solution by using a common stirrer. More homogeneous dispersion can be obtained by conducting ultrasonication by an ultrasonic dispersing machine in accordance with the necessity.

(Formation of Coating Layer)

In the first invention, a coating layer is formed by adding an aqueous acidic solution to the flame-retardant grain dispersion so as to deposit the organic compound on the surface of the flame-retardant grains. The aqueous acidic solution may be added dropwise. In a preferable embodiment, the reaction for forming the coating layer proceeds relatively slowly such that a uniform coating layer is formed on the surface of the flame-retardant grains owing to the slow reaction rate and the above-described conditions.

Examples of the aqueous acidic solution include usual aqueous acidic solutions such as hydrochloric acid, sulfuric acid, acetic acid, and nitric acid. Hydrochloric acid and acetic acid are particularly preferable.

In the invention, the concentration of the aqueous acidic solution is preferably in the range of 0.1 to 50 wt %, more preferably 1 to 10 wt %.

When the concentration is less than 0.1 wt %, the amount of the aqueous acidic solution to be added dropwise to the dispersion liquid has to be increased, and productivity may be lowered. When the concentration is more than 50 wt %, it is not possible to let the reaction for forming the coating layer proceed slowly even when the dropping rate is reduced; therefore, the obtained coated layer may be uneven.

The dropping rate of the aqueous acidic solution into the dispersion is preferably in the range of 1 to 200 ml/hr. A dropping rate of faster than 200 ml/hr may prohibit formation of a uniform coating layer because of the excessively rapid reaction for forming the coating layer. When the dropping rate is slower than 1 ml/hr, the productivity may be insufficient.

The dropping rate of the aqueous acidic solution is more preferably in the range of 20 to 200 ml/hr.

In the invention, it is preferable to control the temperature of the reaction (dispersion) during or after dropwise addition of the aqueous acidic solution in order to let the reaction for forming the coating layer proceed slowly. Specifically, the reaction temperature is preferably in the range of 0 to 100° C., more preferably 0 to 50° C., and still more preferably 5 to 30° C.

A reaction temperature of higher than 100° C. may prohibit formation of a uniform coating layer because of the excessively rapid reaction for forming the coating layer. On the other hand, a reaction temperature of lower than 0° C. may prohibit formation of a uniform coating because of the aggregation of particles.

After the coating layer is formed as described above, surface-coated flame-retardant particles can be obtained by: separating the sol containing the surface-coated flame-retardant particles, for example by centrifugation or decantation with a poor solvent, and then drying the resultant particles.

In the surface-coated flame-retardant particles obtained by the first invention, the amount of the organic compound on the surface of the flame-retardant grains is preferably in the range of 1 to 200 wt %, more preferably 20 to 100 wt %, and still more preferably 30 to 80 wt % with respect to the entire surface-coated flame-retardant particles. A coating amount of less than 1 wt % may lead to generation of aggregates in the matrix resin and production of uneven dispersion. A coating amount of more than 200 wt % may lead to plasticization of the matrix resin when the particles are dispersed therein.

The uniformity of the coated layer can be confirmed by examining the surface-coated flame-retardant particles under a transmission electron microscope.

The first method of producing surface-coated flame-retardant particles according the invention enables production of surface-coated flame-retardant particles having a volume-average particle diameter (average diameter of the circumscribed circle when the surface-coated flame-retardant particles are nonspherical) in the range of 1 to 500 nm. The surface-coated flame-retardant particles preferably have a volume-average diameter in the range of 1 to 200 nm, more preferably 5 to 200 nm, still more preferably 10 to 200 nm, (particularly preferably, 10 to 100 nm).

When the volume-average particle diameter of the surface-coated flame-retardant particles is less than 1 nm, the flame-resistance-retaining capacity may be reduced. When the volume-average particle diameter exceeds 500 nm, the particles show property similar to that of commercially available flame-retardant particles having a volume-average particle diameter of 1 μm, and thus addition thereof in a greater amount is necessary for obtaining flame resistance. Surface-coated flame-retardant particles having a volume-average particle diameter in the above range are capable of being uniformly dispersed in a resin. In addition, flame-retardant particles having a volume-average particle diameter in the nanometer order can form finer complexes, whereby a highly transparent flame-retardant resin composition can be obtained.

The degree of dispersion of the surface-coated flame-retardant particles is preferably in the range of 0.1 to 3.0. The degree of dispersion is more preferably in the range of 0.1 to 1.0 and still more preferably, 0.1 to 0.8.

A smaller degree of dispersion indicates a narrower particle diameter distribution of the surface-coated flame-retardant particles, i.e., more uniform distribution in particle size; and the particles having a dispersion degree in the above range imparts uniform flame resistance and mechanical properties when dispersed in resin.

(Second Method of Producing Surface-coated Flame-retardant Particles)

The second method of producing surface-coated flame-retardant particles according to the invention comprises: preparing a dispersion liquid by dispersing flame-retardant grains in a solution comprising an organic compound and a dispersant dissolved in a water-miscible organic solvent; and forming a coated layer by depositing the organic compound on the surface of the flame-retardant grains by adding water to the dispersion liquid. The flame-retardant grains comprise a metal hydrate containing Mg and one or more metals selected from Ca, Al, Fe, Zn, Ba, Cu and Ni, and have a volume-average particle diameter in the range of 1 to 500 nm. The addition of water to the dispersion liquid may be conducted dropwise.

The second method of producing surface-coated flame-retardant particles forms a coated layer on the surface of the flame-retardant grains having a specific particle diameter by allowing an organic compound to deposit on the surface of the flame-retardant grains in a similar manner to the first method of producing surface-coated flame-retardant particles. However, the second method is different from the first method in that water is replaced by a water-miscible organic solvent, that the organic compound metal salt is replaced by an organic compound, and that the aqueous acidic solution for depositing the organic compound on the surface of the flame-retardant grains is replaced by water.

Accordingly, in the description below, some of the descriptions common to the first method of producing surface-coated flame-retardant particles will be omitted.

(Preparation of Dispersion Liquid)

In the second method, a water-miscible organic solvent is used as the solvent for the solution in which the flame-retardant grains are to be dispersed.

Examples of the water-miscible organic solvent used in the invention include methanol, ethylformamide, nitromethane, ethanol, acrylic acid, acetonitrile, aniline, cyclohexanol, n-butanol, methylamine, n-amyl alcohol, acetone, methylethylketone, chloroform, benzene, ethyl acetate, toluene, diethylketone, carbon tetrachloride, benzonitrile, cyclohexane, isobutyl chloride, diethylamine, methylcyclohexane, isoamyl acetate, n-octane, n-heptane, isobutyl acetate, isopropyl acetate, methylisopropylketone, butyl acetate, methylpropylketone, ethylbenzene, xylene, tetrahydrofuran, trichloroethylene, methylethylketone, methylene chloride, pyridine, n-hexanol, isopropyl alcohol, dimethylformamide, nitromethane, ethylene glycol, glycerol formamide, dimethylformamide, and dimethylsulfoxide.

In the second method of producing surface-coated flame-retardant particles, the organic compound is dissolved in the organic solvent, and this solution is used for producing the dispersion.

The organic compound preferably has an organic group capable of binding to the flame-retardant grains. The organic compound is more preferably a compound having, at a terminal thereof, a binding group capable of forming a bond with the flame-retardant grains.

Examples of the binding group include a hydroxyl group, a phosphoric acid group, a phosphonium salt group, an amino group, a sulfuric acid group, a sulfonic acid group, a carboxylic acid group, a hydrophilic heterocyclic group, a polysaccharide group (e.g., sorbitol, sorbit, sorbitan, sucrose ester, or sorbitan ester residue), a polyether group (e.g., a polyoxyalkylene group having 2 to 4 carbon atoms such as polyoxyethylene or polyoxypropylene), a hydrolyzable group (e.g., an alkoxy group having 1 to 4 carbon atoms such as a methoxy group, an ethoxy, group, a propoxy group, an isopropoxy group, and a butoxy group), and a halogen atom (e.g., a bromine atom or a chlorine atom).

Preferable binding groups include ionic groups (anionic groups and cationic groups) and hydrolyzable groups. The bond between the organic compound and the flame-retardant grains may be an ionic bond or a covalent bond.

A favorable example of the organic group in the organic compound is a hydrophobic higher fatty acid residue.

Examples of the higher fatty acid residue include the higher fatty acid residues described in the first method of producing surface-coated flame-retardant particles.

Examples of the higher alcohol residue include higher fatty alcohol residues having 8 to 24 carbon atoms, such as octyl, nonyl, dodecyl, tetradecyl, hexadecyl (cetyl), octadecyl alcohols. The higher alcohol residue is preferably a higher alcohol residue having 10 to 22 carbon atoms, more preferably having 12 to 20 carbon atoms.

The alkyl-aryl group may be an alkyl (having 1 to 20 carbon atoms)-aryl (having 6 to 18 carbon atoms) group, more preferably an alkyl (having 6 to 18 carbon atoms)-aryl (having 6 to 12 carbon atoms) group, particularly preferably an alkyl (having 6 to 16 carbon atoms)-phenyl group.

Examples thereof include hexylphenyl, octylphenyl, nonylphenyl, decylphenyl, dodecylphenyl, isopropylphenyl, butylphenyl, amylphenyl, and tetradecylphenyl.

These hydrophobic groups may be substituted by various substituents (e.g., alkyl groups having 1 to 4 carbon atoms).

A polyamino acid residue is also preferable as the organic group in the organic compound. Examples of the polyamino acid include the polyamino acids described in the first invention.

The higher fatty acids and polyamino acids described in detail in the first invention are particularly preferable as the organic compound used in second the invention.

In the second method of producing surface-coated flame-retardant particles, the dispersant, the flame-retardant grains, the solution containing them, condition at preparation of the dispersion liquid of the flame-retardant grains, preferable range of the composition, and the like are the same as those described in the first method of producing surface-coated flame-retardant particles.

The dispersion concentration of the flame-retardant particles in the second invention is calculated according to the formula (2) above while the "aqueous solution" in the formula (2) is substituted with "solution".

(Formation of Coating Layer)

In the second method of producing surface-coated flame-retardant particles, water is added to the dispersion liquid to deposit the organic compound on the surface of the flame-retardant grains. In such a case, in a similar manner to the first invention, it is preferable to form a uniform coating layer on the surface of the flame-retardant grains under the condition described above by allowing the reaction for forming the coating layer to proceed relatively slowly. The addition of water to the dispersion liquid may be conducted dropwise.

In the second invention, the dropping rate of water into the dispersion is preferably in the range of 1 to 200 ml/hr. A dropping rate of faster than 200 ml/hr may lead to excessive acceleration of the reaction for forming the coating layer, thereby prohibiting formation of a uniform coating layer. Alternatively, a dropping rate of slower than 1 ml/hr may prohibit sufficiently high productivity.

The dropping rate of water is preferably in the range of 20 to 200 ml/hr. Further, conditions for dispersing the flame-retardant grains, reaction temperature, and the like are the same as in the first invention.

In the surface-coated flame-retardant particles obtained in the second invention, the amount of the organic compound on the flame-retardant grains is preferably in the range of 1 to 200 wt %, more preferably 20 to 100 wt %, and still more preferably, 30 to 80 wt %, with respect to the entire surface-coated flame-retardant particles. A coating amount of less than 1 wt % may lead to generation of aggregates in the matrix resin and production of uneven dispersion. Alternatively, a coating amount of more than 200 wt % may lead to plasticization of the matrix resin when the particles are dispersed therein.

The uniformity of the coating layer can be confirmed by examining the surface-coated flame-retardant particles under a transmission electron microscope.

In the second method of producing surface-coated flame-retardant particles according to the invention, as in the first invention, it is possible to produce surface-coated flame-retardant particles having a volume-average particle diameter (average diameter of the circumscribed circle when the surface-coated flame-retardant particles are nonspherical) in the range of 1 to 500 nm. The surface-coated flame-retardant particles preferably have a volume-average diameter in the range approximately of 1 to 200 nm, more preferably 5 to 200 nm, still more preferably 10 to 200 nm (particularly preferably, 10 to 100 nm).

The degree of dispersion of the surface-coated flame-retardant particles is preferably in the range of 0.1 to 3.0. The degree of dispersion is more preferably in the range of 0.1 to 1.0 and particularly preferably 0.1 to 0.8.

(Third Method of Producing Surface-coated Flame-retardant Particles)

The third method of producing the surface-coated flame-retardant particles according to the invention comprises: preparing a dispersion by dispersing flame-retardant grains in an aqueous solution including a dispersant; and forming a coating layer by adding an aqueous polyamino acid salt solution to the dispersion so as to deposit the polyamino acid on the surface of the flame-retardant grains. The flame-retardant grains comprise a metal hydrate containing Mg and one or more metals selected from Ca, Al, Fe, Zn, Ba, Cu and Ni, and have a volume-average particle diameter in the range of 1 to 500 nm. The addition of the aqueous polyamino acid salt solution to the dispersion may be conducted dropwise The third method of producing surface-coated flame-retardant particles is a method effective when a coating layer is formed by using a polyamino acid among the organic compounds described in the first and second inventions. As the polyamino acid is coated on the surface of the flame-retardant grains in the presence of a dispersant in this production method, the reaction becomes milder, thereby giving a uniform coating layer.

(Preparation of Dispersion Liquid)

In the third invention, flame-retardant grains comprising a specific metal hydrate are dispersed in an aqueous solution containing a dispersant.

The dispersant may be selected from the dispersants described in the first invention. In addition, the concentration of the dispersant in the aqueous solution may be selected from the ranges described in the first invention.

The flame-retardant grains to be dispersed in the aqueous solution containing a dispersant comprise a metal hydrate containing Mg and one or more metals selected from Ca, Al, Fe, Zn, Ba, Cu and Ni. The flame-retardant grains may also be the same as in the first invention.

In the third method of producing surface-coated flame-retardant particles, the dispersant, the aqueous solution containing the flame-retardant grains, condition at preparation of the dispersion liquid of the flame-retardant grains, preferable range of the composition, and the like are the same as in the first method of producing surface-coated flame-retardant particles.

(Formation of Coating Layer)

In the third invention, a coating layer is formed by adding an aqueous polyamino acid salt solution to the flame-retardant grain dispersion liquid so as to deposit the polyamino acid on the surface of the flame-retardant grains. Addition of the aqueous polyamino acid salt solution to the flame-retardant grain dispersion liquid may be conducted dropwise The polyamino acid salt is selected from metal salts of polyamino acids. A polyamino acid is a polymer of an amino acid. The polyamino acid is preferably selected from the polyamino acids mentioned in the first invention. Sodium, potassium, lithium, or the like are used as the metal for forming the metal salt.

In the invention, the concentration of the aqueous polyamino acid salt solution is preferably in the range of 1 to 30 wt % and more preferably in the range of 5 to 10 wt %. A concentration of less than 1 wt % may lead to increase in the amount of the aqueous polyamino acid salt solution to be added dropwise into the dispersion, thereby prohibiting sufficiently high productivity. A concentration of more than 30 wt % may prohibit formation of a uniform coating layer because the reaction for forming the coating layer cannot be maintained mild even when the dropping rate is reduced.

The dropping rate of the aqueous polyamino acid salt solution into the dispersion is preferably in the range of 1 to 1,000 ml/hr and more preferably 10 to 200 ml/hr. A dropping rate of over 1,000 ml/hr may lead to excessive acceleration of the reaction for forming the coating layer, whereby a uniform coating layer may not be obtained. A dropping rate of less than 1 ml/hr may prohibit sufficiently high productivity.

Further in the invention, it is preferable to control the temperature of the reaction (dispersion) during or after dropwise addition of the aqueous acidic solution in order to make the reaction for forming the coating layer mild. Specifically, the reaction temperature is preferably in the range of 0 to 100° C., more preferably 0 to 50° C., still more preferably 5 to 30° C. A reaction temperature of higher than 100° C. may prohibit formation of a uniform coating layer because of the excessively rapid reaction for forming the coating layer. A reaction temperature of lower than 0° C. may prohibit formation of a uniform coating because of aggregation of particles.

In the surface-coated flame-retardant particles obtained by the third invention, the amount of the organic compound on the flame-retardant grains is preferably in the range of 20 to 200 wt % and more 20 to 80 wt % with respect to the entire surface-coated flame-retardant particles. A coating amount of less than 20 wt % may lead to generation of aggregates in the matrix resin and production of uneven dispersion. Alternatively, a coating amount of more than 200 wt % may lead to plasticization of the matrix resin when the particles are dispersed therein.

The uniformity of the coating layer can be confirmed by examining the surface-coated flame-retardant particles under a transmission electron microscope.

According to the third method of producing surface-coated flame-retardant particle of the invention, it is possible to produce surface-coated flame-retardant particles having a volume-average particle diameter (average diameter of the circumscribed circle when the surface-coated flame-retardant particles are nonspherical) in the range of 1 to 500 nm, as in the first invention. The surface-coated flame-retardant particles preferably have a volume-average diameter in the range approximately of 1 to 200 nm, more preferably 5 to 200 nm, still more preferably 10 to 200 nm (particularly preferably, 10 to 100 nm).

In addition, the degree of dispersion of the surface-coated flame-retardant particles is preferably in the range of 0.1 to 3.0. The degree of dispersion is more preferably in the range of 0.1 to 1.0 and particularly preferably 0.1 to 0.8.

(Fourth Method of Producing Surface-coated Flame-retardant Particles)

The fourth method of producing surface-coated flame-retardant particle according to the invention comprises: forming metal soap particles having a micellar or vesicular structure by dissolving at least a metal salt comprising Mg and one or more metals selected from Ca, Al, Fe, Zn, Ba, Cu and Ni and a surfactant in water; suspending the metal soap particles in an organic solvent so as to convert them into reverse micelle particles; and converting the metal ions contained in the reverse micelle particles into metal hydroxides through a reaction with a base.

According to the fourth method of producing surface-coated flame-retardant particles, it is possible to form a coating layer of an organic compound in a uniform and controlled manner on the surface of nanometer-sized grains comprising a metal hydrate having a larger surface area, as in the first to third inventions. In the fourth invention, a template (a micelle in the core-shell structure having hydrophobic groups inside and hydrophilic groups outside) is formed in water. It is possible to produce surface-coated flame-retardant particles having a uniform coated layer in a simple manner because the surface-coating reaction progresses along with the metal hydrate synthesis.

(Formation of Metal Soap Particles)

In the fourth invention, metal soap particles having a micellar or vesicular structure are formed by dissolving a metal salt containing a specific metal and a surfactant in water. The term "micellar structure" means a spherical structure in which hydrophobic groups (organic groups) face inward and in which hydrophilic groups (metal ions) face outward (toward water phase). The term "vesicular structure" means a spherical structure in which water is enclosed by a bilayer membrane.

In the fourth invention, the metal salt contains a magnesium salt as an essential component. As long as the metal salt is soluble in water, the metal salt may comprise chlorides, nitrates, sulfates, carbonates and the like of Mg and of at least one of Ca, Al, Fe, Zn, Ba, Cu and Ni. Among the salts above, chloride salts are preferable, and, for example, magnesium chloride is particularly preferable as the salt of Mg.

The surfactant is preferably an anionic surfactant such as a carboxylate salt, a sulfonate salt, a sulfate salt, or a phosphoric ester. The anionic surfactant is preferably a carboxylate salt having 8 to 30 carbon atoms, a sulfonate salt, a sulfate salt, or a phosphate ester.

Typical examples of the carboxylic acid for forming the carboxylate salt include: saturated fatty acids having 8 to 30 carbon atoms (preferably saturated fatty acids having 10 to 28 carbon atoms, more preferably having 12 to 26 carbon atoms) such as lauric acid, myristic acid, palmitic acid, arachic acid, behenic acid, rignoceric acid, cerotic acid, caprylic acid, capric acid, daturic acid, stearic acid, isostearic acid, montanic acid, and melissic acid; and unsaturated fatty acids having 12 to 30 carbon atoms (preferably unsaturated fatty acids having 14 to 28 carbon atoms, more preferably having 14 to 26 carbon atoms) such as elaidic acid, linolic acid, linoleic acid, linderic acid, oleic acid, gadoleic acid, erucic acid, and brassidic acid.

Examples of the sulfonate salt include an alkyl- or alkenylsulfonate salt, an alkylallylsulfonate salt, a polycondensates of an alkylallylsulfonate salt, and an alkylsulfonesuccinate salt.

Examples of the sulfate salt include alkylsulfuric ester salts, polyoxyethylene alkyl ether sulfate salts, and polyoxyethylene alkyl phenyl ether sulfate salts. Examples of the phosphoric ester include alkylphosphoric esters, polyoxyalkylene alkyl (phenyl) ether phosphoric ester salts, and inorganic phosphate salts.

Among them, salts of behenic acid, stearic acid, and isostearic acid are preferable.

The concentration of the metal salt containing a Mg salt in the aqueous solution is preferably in the range of 0.1 to 10 wt %, more preferably 1 to 8 wt % in terms of the concentration of the metal ion. A concentration of less than 0.1 wt % may cause productivity problems. A concentration of higher than 10 wt % may prohibit production of nanometer-sized uniform flame-retardant particles.

The concentration of the surfactant in the aqueous solution is preferably in the range of 50 to 1,000 mole %, more preferably, 50 to 500 mole %, with respect to the amount of the metal ions described above. A surfactant concentration of less than 50 mole % may lead to insufficient formation of the metal soap described below. A surfactant concentration of over 1,000 mole % may lead to generation of insoluble matters in the aqueous solution.

In the aqueous solution containing the metal salt and the surfactant, metal soap particles having a spherical micellar structure or a vesicular structure are formed. In the micellar structure, the hydrophobic groups of the anionic surfactant such as alkyl chains face inward, the hydrophilic groups of the anionic surfactant such as carboxylic groups face outward, and the metal ions are adsorbed by the hydrophilic groups. In the vesicular structure, the anionic surfactant is further adsorbed on such a micellar structure.

The metal soap particles may be collected by salting out, for example, by adding a great amount of sodium chloride into the aqueous solution, or the metal soap particle contained in the aqueous solution may be used as it is in a subsequent treatment.

(Conversion into Reverse Micelle Particle)

The metal soap particles obtained above are suspended in an organic solvent so as to cause inversion of the layers of the micelle. As a result, reverse micelle particles are formed in which the metal ions are positioned inside and in which the hydrophobic groups such as alkyl chains face outward. In the reverse micelle particles, the surfactant has an orientation in which the hydrophilic moiety faces inward and the hydrophobic moiety faces outward.

The conversion into the reverse micelle particles is easily carried out, for example, by suspending the sol containing the micelle particles having metal ions adsorbed thereon in an organic solvent. The term "suspending" used herein refers to dispersing particles in a solvent such that the particles are separated from each other without forming aggregates.

Examples of the organic solvents to be used include methanol, ethylformamide, nitromethane, ethanol, acrylic acid, acetonitrile, aniline, cyclohexanol, n-butanol, methylamine, n-amyl alcohol, acetone, methylethylketone, chloroform, benzene, ethyl acetate, toluene, diethylketone, carbon tetrachloride, benzonitrile, cyclohexane, isobutyl chloride, diethylamine, methylcyclohexane, isoamyl acetate, n-octane, n-heptane, isobutyl acetate, isopropyl acetate, methylisopropylketone, butyl acetate, methylpropylketone, ethylbenzene, xylene, tetrahydrofuran, trichloroethylene, methylethylketone, methylene chloride, pyridine, n-hexanol, isopropyl alcohol, dimethylformamide, nitromethane, ethylene glycol, glycerol formamide, dimethylformamide, and dimethylsulfoxide.

The volume-average particle diameter of the formed reverse micelle particles is preferably 500 nm or less. When the volume-average particle diameter of the reverse micelle particles is over 500 nm, the volume-average particle diameter of the finally obtained surface-coated flame-retardant particles is more than 500 nm, whereby addition of a great amount of the surface-coated flame retardant particles to the resin may be necessary for obtaining desirable flame resistance.

(Formation of Metal Hydroxide)

The reverse micelle particles obtained above are further hydroxylated in the organic solvent, and the metal ions contained in the reverse micelle particles are converted to hydroxides.

In the hydroxylation, the metal ions are treated with a base, so that the metal ions are converted to hydroxides. The base is not particularly limited, and specifically, an alkaline solution may be used. Examples thereof include concentrated ammonia, an aqueous sodium hydroxide solution, and an aqueous potassium hydroxide solution. An alkaline solution in an amount of 0.1 to 10 moles per 1 mole of hydroxyl group (in other words, per 1 mol of valence of the metal) is needed for hydroxylation, and the concentration of the alkaline solution is preferably in the range of 0.1 to 80 wt %. Examples of the solvents to be used include the solvents described above.

The metal ions are converted to metal hydroxides as the reaction progresses. In some cases, the metal hydroxides incorporate crystallization water. Since the reaction proceeds inside the reverse micelle particles, the surface of the obtained flame-retardant particles is coated with long-chain alkyl groups while the particle shape is unchanged.

Further in the invention, it is preferable to control the temperature of the hydroxylation reaction (temperature of the suspension liquid) in order to control the crystal growth of the particles. Specifically, the reaction temperature is preferably in the range of 0 to 100° C., more preferably 0 to 50° C., still more preferably 5 to 30° C.

A reaction temperature of higher than 100° C. may result in excessively rapid coating reaction, thus prohibiting uniform coating. On the other hand, a reaction temperature of lower than 0° C. may prohibit formation of a uniform coated layer because of aggregation of the particles.

After the formation of the metal hydroxide (formation of the coating layer), the surface-coated flame-retardant particles can be obtained by a process comprising separating the sol of the surface-coated flame-retardant particles, for example, by centrifugation or decantation with a poor solvent and drying the separated particles. As an alternative, the surface-coated flame-retardant particles dispersed in the organic solvent may be used as it is.

In the surface-coated flame-retardant particles obtained by the fourth invention, the amount of the organic compound derived from the surfactant on the flame-retardant grains is preferably in the range of 1 to 200 wt %, more preferably, 20 to 100 wt %, and still more preferably 30 to 80 wt %, with respect to the entire surface-coated flame-retardant particles. A coating amount of less than 1 wt % may result in insufficient coating of the particles. Alternatively, a coating amount of more than 200 wt % may lead to generation of aggregates in the matrix resin.

The uniformity of the coating layer can be determined by examining the surface-coated flame-retardant particles under a transmission electron microscope.

By the fourth method of producing surface-coated flame-retardant particles according to the invention, it is possible to produce surface-coated flame-retardant particles having a volume-average particle diameter (average diameter of the circumscribed circle when the surface-coated flame-retardant particles are nonspherical) in the range of 1 to 500 nm, as in the first invention. The surface-coated flame-retardant particles preferably have a volume-average diameter in the range of 1 to 200 nm, more preferably 5 to 200 nm, and still more preferably 10 to 200 nm (particularly preferably, 10 to 100 nm).

In addition, the degree of dispersion of the surface-coated flame-retardant particles is preferably in the range of 0.1 to 3.0. The degree of dispersion is more preferably in the range of 0.1 to 1.0 and particularly preferably 0.1 to 0.8.

(Fifth Method of Producing Surface-coated Flame-retardant Particles)

The fifth method of producing surface-coated flame-retardant particles according to the invention comprises: preparing a suspension liquid containing an organic compound metal salt comprising Mg and one or more metals selected from Ca, Al, Fe, Zn, Ba, Cu and Ni suspended in an organic solvent, and forming a metal hydroxide by treating the metal ions contained in the organic compound metal salt with a base.

By the fifth method of producing surface-coated flame-retardant particles, it is possible to form a coating layer of an organic compound in a uniform and controlled manner on the surface of nanometer-sized grains comprising a metal hydrate having a larger surface area, as in the first to fourth inventions. In the fifth invention, it is possible to raise the productivity of the surface-coated flame-retardant particles because, dissimilarly from the above methods, this method does not require a dispersant or a surfactant and because the surface-coated flame-retardant particles can be prepared without use of a template (micelle in the core-shell structure having the hydrophobic groups inside and the hydrophilic groups facing outward) in water.

Further, the surface-coated flame-retardant particles thus prepared contain no alkali metals such as sodium because of its production process. Therefore, the surface-coated flame-retardant particles are resistant to deterioration over a long period of time when dispersed in a matrix resin, whereby the flame resistance and the mechanical properties of the flame-retardant resin composition containing the surface-coated flame-retardant particles is stabilized more.

Hereinafter, the fifth invention will be described in detail.
(Formation of Suspension Liquid)

A suspension liquid is prepared by suspending an organic compound metal salt containing a specific metal in an organic solvent. The meaning of the term "suspending" is as defined above.

In the fifth invention, an organic compound metal salt is used which comprises Mg and one or more metals selected from Ca, Al, Fe, Zn, Ba, Cu and Ni. The metal contained in the organic compound metal salt is stable when converted into a hydrate. Since the organic compound metal salt comprises Mg metal as an essential component and other metal(s), the metal is effective for improving the flame-retarding effects. For example, a combination of Mg and Ni or Fe dehydrogenates the hydrocarbons derived from the resin component vaporized during combustion, thereby improving the flame-retarding effects of the resin composition and suppressing smoke generation. A combination of Mg and Al adjusts the water-releasing temperature during combustion, thereby improving the flame-retarding effects.

An example of the organic compound metal salt is a compound having an organic group which heightens the dispersibility when the particles (as the flame-retardant particles) are dispersed in a resin, wherein the organic group forms a salt with an inorganic base including a metal via an anionic binding group (e.g., a sulfuric acid group, a sulfonic acid group, or a carboxyl group).

That is, the organic compound region in the organic compound metal salt has, therein and/or at a terminal thereof, a binding region forming a salt with an inorganic base including a metal.

Examples of the organic group in the organic compound include a group functioning as the hydrophobic group of a surfactant (e.g., a higher fatty acid residue, a higher alcohol residue, or an alkyl-aryl group), and a polyamino acid residue.

The higher fatty acid is preferably a higher fatty acid having 8 or more carbon atoms, more preferably a saturated fatty acid having 8 to 30 carbon atoms or an unsaturated fatty acid having 12 to 30 carbon atoms. The saturated fatty acid is more preferably a saturated fatty acid having 10 to 28 carbon atoms, particularly preferably a saturated fatty acid having 12 to 26 carbon atoms. The unsaturated fatty acid is preferably an unsaturated fatty acid having 14 to 28 carbon atoms, more preferably an unsaturated fatty acid having 14 to 26 carbon atoms.

Specific examples thereof include saturated carboxylic acids such as lauric acid, myristic acid, palmitic acid, arachic acid, behenic acid, rignoceric acid, cerotic acid, caprylic acid, capric acid, daturic acid, stearic acid, isostearic acid, montanic acid, and melissic acid; and unsaturated carboxylic acids such as elaidic acid, linolic acid, linoleic acid, linderic acid, oleic acid, gadoleic acid, erucic acid, and brassidic acid.

The hydrophobic groups of these acids may be substituted by various substituents (e.g., alkyl groups having 1 to 4 carbon atoms).

Among them, saturated fatty acids having 12 to 26 carbon atoms such as behenic acid, stearic acid, and isostearic acid are particularly preferable.

The organic solvent is not particularly limited, and examples thereof include methanol, ethylformamide, nitromethane, ethanol, acrylic acid, acetonitrile, aniline, cyclohexanol, n-butanol, methylamine, n-amyl alcohol, acetone, methylethylketone, chloroform, benzene, ethyl acetate, toluene, diethylketone, carbon tetrachloride, benzonitrile, cyclohexane, isobutyl chloride, diethylamine, methylcyclohexane, isoamyl acetate, n-octane, n-heptane, isobutyl acetate, isopropyl acetate, methylisopropylketone, butyl acetate, methylpropylketone, ethylbenzene, xylene, tetrahydrofuran, trichloroethylene, methylethylketone, methylene chloride, pyridine, n-hexanol, isopropyl alcohol, dimethylformamide, nitromethane, ethylene glycol, glycerol formamide, dimethylformamide, and dimethylsulfoxide.

Only a single solvent may be used or a combination of two or more solvents may be used.

In the fifth invention, the organic compound metal salt is suspended in the organic solvent to directly form so-called reverse micelle particles in the suspension liquid; in the reverse micelle particles, the metal ions are positioned inside and the hydrophobic groups face outward. Therefore, it is possible to raise the productivity of the surface-coated flame-retardant particles because the dispersant or template is not required.

The concentration of the organic compound metal salt in the suspension liquid should be in a specific range in order to obtain nanometer-sized uniform particles, and is in the range of 0.1 to 10 wt % in the invention. By setting the concentration of the organic compound metal salt at a relatively low value, it becomes possible to form reverse micelle particles having a uniform particle diameter.

The concentration of the organic compound metal salt is preferably in the range of 0.1 to 10 wt %, more preferably 1 to 5 wt %. A concentration of less than 0.1 wt % may prohibit sufficiently high productivity of the surface-coated flame-retardant particles. A concentration of more than 10 wt % makes is difficult to obtain particles having a uniform nanometer-sized particle diameter.

(Formation of Metal Hydroxide)

The reverse micelle particles obtained above are then hydroxylated in the organic solvent so as to convert the metal ions bound to the organic compound region to hydroxides.

In the hydroxylation, the metal ions are treated with a base, so that the metal ions are hydroxylated. Bases similar to the bases described in the fourth invention may be used under a similar condition to the condition employed in the fourth invention.

The reaction temperature (temperature of suspension liquid) during the hydroxylation reaction of the invention is preferably within the temperature range described in the fourth invention.

After the formation of the metal hydroxide (formation of the coating layer), the surface-coated flame-retardant particles are obtained by a process comprising separating the sol of the surface-coated flame-retardant particles, for example, by centrifugation or decantation with a poor solvent and drying the separated particles. As an alternative, the surface-coated flame-retardant particles dispersed in the organic solvent may be used as they are.

In the surface-coated flame-retardant particles prepared by the fifth invention, the amount of the organic compound on the flame-retardant grains is preferably in the range of 1 to 200 wt %, more preferably 20 to 100 wt %, still more preferably, 30 to 80 wt % with respect to the entire surface-coated flame-retardant particle. A coating amount of less than 1 wt % may result in insufficient coating of the particles. Alternatively, a coating amount of more than 200 wt % may lead to generation of aggregates in the matrix resin.

The uniformity of the coating layer can be confirmed by examining the surface-coated flame-retardant particles under a transmission electron microscope.

By the fifth method of producing surface-coated flame-retardant particles according to the invention, it is possible to produce surface-coated flame-retardant particles having a volume-average particle diameter (average diameter of the circumscribed circle when the surface-coated flame-retardant particles are nonspherical) in the range of 1 to 500 nm, as in the first invention. The surface-coated flame-retardant particles preferably have a volume-average diameter approximately of 1 to 200 nm, more preferably 5 to 200 nm, and still more preferably 10 to 200 nm (particularly preferably, 10 to 100 nm).

In addition, the degree of dispersion of the surface-coated flame-retardant particles is preferably in the range of 0.1 to 3.0. The degree of dispersion is more preferably in the range of 0.1 to 1.0, particularly preferably 0.1 to 0.8.

<Sixth Method of Producing Surface-coated Flame-retardant Particles>

The sixth method of producing surface-coated flame-retardant particles according to the invention comprises: preparing a first aqueous solution comprising an organic compound metal salt containing Mg and one or more metals selected from Ca, Al, Fe, Zn, Ba, Cu and Ni and a dispersant or chelate compound; adding a second aqueous solution of a metal ion to the first aqueous solution; and converting the metal ions contained in the organic compound metal salt into metal hydroxides by treating the mixed aqueous solution containing the metal ions with a base. The addition of the second aqueous solution to the first aqueous solution may be conducted dropwise.

Dissimilarly from the fifth method of producing surface-coated flame-retardant particles, in the sixth method of producing surface-coated flame-retardant particles, micelles (template) in water in which the hydrophobic groups are positioned inside (micelle center side) and in which the metal ions face outward (aqueous solution side) are formed, and the metal ions are hydroxylated to give surface-coated flame-retardant particles. In the sixth invention, it is possible to produce final particles having a particle diameter distribution close to monodispersion and to form a uniform coating layer because of the simultaneous presence of the organic compound metal, the dispersant or chelete compound, and the metal ion in the reaction system which slows the hydroxylation reaction.

Hereinafter, details of the sixth invention will be described.

(Preparation of Aqueous Solution)

An aqueous solution is prepared in which an organic compound metal salt containing a particular metal and a dispersant or a chelate compound are dissolved.

The organic compound metal salt containing a particular metal may be selected from the organic compound metal salts described in the fifth invention. The dispersant may be selected from the dispersants described in the first invention.

The chelate compound may be either a low-molecular weight compounds or a polymeric compound. Examples thereof include ethylenediamine, oxalatos, ethyl acetoacetate, and o-nitrophenol. Among them, ethylenediamine is preferable.

In the sixth invention, the organic compound metal salt and the dispersant or chelate compound are dissolved in water to form micelles in which the hydrophobic groups are positioned inside (micelle center side) and in which the metal ions face outward (water side).

The concentration of the organic compound metal salt in the aqueous solution should be in a specific range in order to uniformly coat the entire flame-retardant particle surface, and is preferably in the range of 10 to 50 wt % in the invention. It is possible to form a coating layer uniformly on the nanometer-sized particle surface by setting the concentration of the organic compound metal salt at such a high value.

The concentration of the organic compound metal salt is preferably in the range of 10 to 40 wt %. A concentration of less than 10 wt % may make it difficult to coat the organic compound uniformly on the surface of the flame-retardant grains and lead to generation of uncoated areas. A concentration of more than 50 wt % makes it difficult to coat the organic compound uniformly on the surface of the flame-retardant grains and generates aggregates.

In addition, the concentration of the dispersant or the chelate compound in the aqueous solution is preferably in a specific range from the same viewpoint as described above.

Specifically, the concentration of the dispersant or chelate compound is preferably in the range of 1 to 10 wt %, more preferably 1 to 5 wt %, with respect to the metal amount in the aqueous solution. When the concentration of the dispersant or chelate compound is less than 1 wt %, the chelate compound may not be deposited on the surface of the grains and uniform reaction may not occur. When the concentration of the dispersant or chelate compound is more than 10 wt %, the chelate compounds may form aggregates and impurities may remain in a large amount after reaction, whereby it is difficult to purify the particles sufficiently.

(Addition of Aqueous Metal Ion Solution)

An aqueous metal ion solution is added to the prepared aqueous solution so as to stabilize the metal ion derived from the organic metal compound metal salt and so as to slow the hydroxylation reaction described below. The addition may be conducted dropwise.

In order that the hydroxylation reaction proceeds basically in the phase containing the metal ions, the dropwise addition of the aqueous metal ion solution may be performed before the formation of the metal hydroxides or simultaneously with the formation of the metal hydroxides.

The metal ion to be contained in the aqueous metal ion solution is preferably ion(s) of one or more metals selected from Mg, Ca, Al, Fe, Zn, Ba, Cu and Ni. The form of the compound used for preparation of the aqueous metal ion solution is not limited if the compound is soluble in water, and may be selected from chlorides, nitrates, sulfates, and carbonates of Mg, Ca, Al, Fe, Zn, Ba, Cu and Ni. Among them, chlorides of the metals are preferable.

The concentration of the aqueous metal ion solution used in the invention is preferably 0.1 to 50 wt %, more preferably 1 to 30 wt %.

A concentration of less than 0.1 wt % may result in excessive dilution of the metal ions in the solution, whereby the reaction may not proceed. A concentration of over 50 wt % may lead to excessive progress of the reaction, and the crystal growth of particles may not be controlled.

The dropping rate of the aqueous metal ion solution is preferably in the range of 1 to 200 ml/hr and more preferably 20 to 200 ml/hr. A dropping rate of over 200 ml/hr may result in generation of large-sized particles since the particle crystal growth may not be controlled; therefore, the particle size may not be uniform in that case. A dropping rate of slower than 1 ml/hr may prohibit sufficiently high productivity.

(Formation of Metal Hydroxides)

The formed micelles are subjected to a hydroxylation treatment so as to convert the metal ions bound to the organic compound region (metal ions in the organic compound metal salt) are converted to hydroxides.

In the sixth invention, during the preparation of an aqueous solution of the organic compound metal salt described above, the organic compound metal salt is present in the form of micelle particles, preferably in the form in which the metal ions are present outside (water side).

In the invention, since it is necessary to prepare flame-retardant particles comprising the flame-retardant grains and an organic compound coated on the surface of the flame-retardant grains as the final product, the obtained micelle particles having metal ions (or metal hydroxides) on their outside have to be converted to reverse micelles (micelles having the hydrophobic groups facing outward) by a method similar to the method described above.

The conversion may be performed before or after the formation of the metal hydroxides.

In the hydroxylation, the metal ions are treated with a base so as to be hydroxylated. For example, the aqueous basic solutions described in the fourth invention may be used as the base under the same condition as described in the fourth invention.

The dropping rate of the basic solution into the aqueous solution is preferably in the range of 1 to 200 ml/hr, more preferably 20 to 200 ml/hr. A dropping rate of faster than 200 ml/hr may lead to excessive acceleration of the reaction for forming the coating layer, thereby prohibiting formation of a uniform coating layer. On the other hand, a dropping rate of slower than 1 ml/hr may prohibit sufficiently high productivity.

Other conditions such as the temperature of hydroxylation reaction are the same as those described in the fourth invention.

In the surface-coated flame-retardant particles obtained by the sixth invention, the amount of the organic compound on the flame-retardant grains is preferably in the range of 1 to 200 wt %, more preferably 20 to 100 wt %, still more preferably 30 to 80 wt %, with respect to the entire surface-coated flame-retardant particles. A coating amount of less than 1 wt % may result in insufficient coating of the particles. Alternatively, a coating amount of more than 200 wt % may lead to generation of aggregates in the matrix resin.

The uniformity of the coating layer can be confirmed by examining the surface-coated flame-retardant particles under a transmission electron microscope.

By the sixth method of producing surface-coated flame-retardant particles according to the invention, it is possible to produce surface-coated flame-retardant particles having a volume-average particle diameter (average diameter of the circumscribed circle when the surface-coated flame-retardant particles are nonspherical) in the range of 1 to 500 nm, as in the first invention. The surface-coated flame-retardant particles preferably have a volume-average diameter in the range of 1 to 200 nm, more preferably 5 to 200 nm, and still more preferably 10 to 200 nm (particularly preferably, 10 to 100 nm).

In addition, the degree of dispersion of the surface-coated flame-retardant particles is preferably in the range of 0.1 to 3.0. The degree of dispersion is more preferably in the range of 0.1 to 1.0 and particularly preferably 0.1 to 0.8.

(Seventh Method of Producing Surface-coated Flame-retardant Particles)

In the seventh method of producing surface-coated flame-retardant particles according to the invention, flame-retardant grains of a metal hydrate containing Mg and one or more metals selected from Ca, Al, Fe, Zn, Ba, Cu and Ni having a volume-average particle diameter in the range of 1 to 500 nm are treated with vapor of a cyclic organosiloxane compound, so that ring-opening polymerization of the cyclic organosiloxane compound occurs to form a coating layer on the surface of the flame-retardant grains.

The seventh method of producing surface-coated flame-retardant particles is a method of producing surface-coated flame-retardant particles comprising the flame-retardant grains and a polysilicone-containing coated layer on the surface of the flame-retardant grains. It is possible to form a more uniform coated layer without coating unevenness by treating the grains with a cyclic organosiloxane compound in the gas phase, than in the case of conventional surface treatments in liquid.

The flame-retardant grains for use in the seventh method of producing surface-coated flame-retardant particles are the same as the flame-retardant grains described in the first method of producing surface-coated flame-retardant particles. In addition, the cyclic organosiloxane compound used for treating the flame-retardant grains may be selected from the cyclic organosiloxane compounds described in the above inventions.

In the invention, a cyclic organosiloxane compound is deposited on the surface of the flame-retardant grains in the gas phase.

In a typical example of the method, the flame-retardant grains and a cyclic organosiloxane compound are respectively placed in separate containers left in a sealed processing chamber at 100° C. or less while the top of the containers are left open.

If the flame-retardant grains were not reactive, the surface of the flame-retardant grains would return to the original state by desorption of the cyclic organosiloxane compound when the treated flame-retardant particles are taken out of the processing chamber. In the seventh invention, since the flame-retardant grains have active sites on their surface, the adsorbed cyclic organosiloxane compound polymerizes on the grains to form a polysilicone coating layer.

For conducting the surface treatment in the above manner, there is no need for a special apparatus, and a sealed processing chamber that can keep a constant temperature is sufficient. Even a desiccator may be used for a small-scale processing. However ideally, an apparatus that can conduct deaeration after treatment is preferable, and use of a vacuum oven is particularly preferable.

The treatment temperature is preferably in the range of 70 to 200° C. and more preferably, 100 to 150° C. The treatment period is preferably in the range of 1 to 100 hours and more preferably 6 to 48 hours. The remaining unpolymerized cyclic organosiloxane compound is then removed by deaeration, to give surface-coated flame-retardant particles.

In the surface-coated flame-retardant particles obtained by the seventh invention, the amount of the polysilicone on the flame-retardant grains is preferably in the range of 20 to 200 wt % and more preferably, 20 to 80 wt % with respect to the entire surface-coated flame-retardant particles. A coating amount of less than 20 wt % may result in generation of aggregates in the matrix resin and uneven dispersion of the surface-coated flame-retardant particles. A coating amount of over 200 wt % may result in plasticization of the matrix resin when the particles are dispersed therein.

The uniformity of the coating layer can be confirmed by examining the surface-coated flame-retardant particles under a transmission electron microscope.

By the seventh method of producing surface-coated flame-retardant particles according to the invention, it is possible to produce surface-coated flame-retardant particles having a volume-average particle diameter (average diameter of the circumscribed circle when the surface-coated flame-retardant particles are nonspherical) in the range of 1 to 500 nm, as in the first invention. The surface-coated flame-retardant particles preferably have a volume-average diameter in the range of 1 to 200 nm, more preferably 5 to 200 nm, and still more preferably 10 to 200 nm (particularly preferably, 10 to 100 nm).

In addition, the degree of dispersion of the surface-coated flame-retardant particles is preferably in the range of 0.1 to 3.0. The degree of dispersion is more preferably in the range of 0.1 to 1.0, particularly preferably 0.1 to 0.8.

<Flame-retardant Resin Composition and Production Method Thereof>

The flame-retardant resin composition according to the invention and the production method thereof will be described next. The flame-retardant resin composition according to the invention is prepared by blending at least the surface-coated flame-retardant particles of the invention and a matrix resin.

As will be described below, use of the surface-coated flame-retardant particles according to the invention allows improvement in dispersion state of the flame retardant in the matrix resin and production of a flame-retardant resin composition having flame resistance without deterioration of the physical properties of the polymer. The term "flame resistance" or "flame-retarding" used herein refers to such a property that when 5 parts by weight of the flame-retardant compound is added to 100 parts by weight of an ethylene-vinyl acetate copolymer resin, the maximum heat release rate (specified in ISO 5660-1 which is incorporated herein by reference) of the resin containing the flame-retardant compound is lower by at least 25% than that of the resin not containing the flame retardant compound.

The matrix resin for the flame-retardant resin composition in which the surface-coated flame-retardant particles of the invention are dispersed, is not particularly limited if it is a polymeric compound such as rubber, plastic, or the like. Typical examples thereof include: biodegradable resins, ABS resins, ACS resins, alkyd resins, amino resins, ASA resins, bismaleimide triazine resins, chlorinated polyether, chlorinated polyethylene, allyl resins, epoxy resins, ethylene-propylene copolymers, ethylene-vinyl acetate-vinyl chloride copolymers, ethylene-vinyl chloride copolymers, ethylene-vinyl acetate copolymer resins, FRP's, ionomers, methacrylic ester-styrene copolymers, nitrile resins, polyester, olefin vinylalcohol copolymers, petroleum resins, phenolic resins, polyacetal, polyacrylate, polyallylsulfone, polybenzoimidazole, polybutadiene, polybutylene, polybutylene terephthalate, polycarbonate, polyetheretherketone, polyetherketone, polyethernitrile, polyethersulfone, polyethylene, polyethylene terephthalate, polyketone, methacrylic resin, polymethylpentene, polypropylene, polyphenyleneether, polyphenylenesulfide, polysulfone, polystyrene, SAN resins, butadiene-styrene resins, polyurethane, polyvinylacetate, polyvinylalcohol, polyvinyl chloride, polyvinylidene chloride, fluororesins, silicone resins, polyvinyl acetate, xylene resins, thermoplastic elastomers, EPDM's, CR's, BR's, nitrile rubbers, natural rubbers, acrylonitrile-butadiene rubbers, fluorine rubbers, and butyl rubbers.

Among them, biodegradable resins are particularly preferable. Only a single resin may be used as the matrix resin, or a combination of two or more resins may be used as the matrix resin.

The flame-retardant resin composition according to the invention may further comprise other commonly-used additives such as a stabilizer. The additives are not particularly limited, and examples thereof include crosslinking agents, crosslinking accelerators, crosslinking acceleration aids, activators, crosslinking inbibitors, anti-aging agents, antioxidants, antiozonants, ultraviolet absorbents, photostabilizers, tackifiers, plasticizers, softeners, reinforcing agents, toughening agents, expanding agents, expansion aids, stabilizers, lubricants, mold release agents, antistatic agents, modifying agents, colorants, coupling agents, antiseptics, fungicides, modifiers, adhesives, reodorants, polymerization catalysts, polymerization initiators, polymerization inhibitors, polymerization modifiers, nucleating agents, compatibilizers, dispersants, and antifoams.

Only a single additive may be used, or two or more additives may be used in combination.

In an embodiment, the flame-retardant resin composition according to the invention comprises the surface-coated flame-retardant particles described above and particles of another (second) flame-retardant compound having a larger particle diameter than the surface-coated flame-retardant particles. In this embodiment, these flame-retardant substances can be distributed throughout the matrix resin since, in the polymer matrix, the smaller flame-retardant fine particles fill the gaps among the larger particles. Accordingly, the flame resistance is further improved by this effect.

The particles of the second flame-retardant compound preferably have a volume-average particle diameter in the range of 0.5 to 50 μm, more preferably in the range of 0.5 to 30 μm. When the volume-average particle diameter is less than 0.5 μm, the particles may be too small to form the above structure. When the volume-average particle diameter is larger than 50 μm, the mechanical characteristics of the polymer may be deteriorated.

The second flame-retardant compound is not particularly limited, and is preferably at least one compound selected from hydrated metal compounds, inorganic hydrates, nitrogen-containing compounds, and silicon-containing inorganic fillers.

The hydrated metal compound is preferably a compound selected from aluminum hydroxide, magnesium hydroxide, and calcium hydroxide. The inorganic hydrate is preferably a compound selected from calcium aluminate, calcium sulfate dihydrate, zinc borate, barium metaborate, borax, and kaolin clay. The nitrogen-containing compound is preferably sodium nitrate. Further, the silicon-containing inorganic filler is preferably selected from molybdenum compounds, zirconium compounds, antimony compounds, dawsonite, phlogopite, smectite, and the like.

Only a single compound may be used as the second flame-retardant compound, or a mixture of two or more compounds may be used as the second flame-retardant compound. In addition, the second flame-retardant compound may be the same as or different from the compound constituting the inorganic fine grains to be used in the surface-coated flame-retardant particle.

The content of the particles of the second flame-retardant compound is preferably in the range of 0.1 to 200 parts by weight, more preferably 0.1 to 50 parts by weight, per 100 parts by weight of the surface-coated flame-retardant particles. When the content of the particles of the second flame-retardant compound is less than 0.1 part by weight, the content is too low to form the above structure. When the content of the particles of the second flame-retardant compound is more than 200 parts by weight, the mechanical characteristics of the polymer are deteriorated owing to the excessively large amount of the second flame-retardant compound.

In another embodiment, the surface-coated flame-retardant particles according to the invention are used together with a smectite having an organic moiety attached thereto. In this embodiment, the flame-retardant substances are distributed throughout the matrix resin because the gaps between the smectite particles having a larger aspect ratio are filled with the surface-coated flame-retardant particles. Further, the dispersed smectite does not impair the transparency of the resin owing to the existence of the organic moiety which improves the dispersion state of the smectite particles. The surface-modified flame-retardant particles of the invention are smaller than the wavelength of visible light and are dispersible in the resin uniformly. Accordingly, the resin in the above embodiment is superior in transparency.

The flame-retardant resin composition is prepared by: mixing the surface-coated flame-retardant particles according to the invention, the matrix resin, and optional components such as the second flame-retardant compound and a stabilizer; and kneading the mixture by a kneading machine.

The kneading machine is not particularly limited. From the viewpoint of obtaining good dispersion state, the following methods are preferable: a method of dispersing the flame-retardant particles in the matrix resin by repetition of shearing stress and agitation by three rolls or two rolls, and a method of dispersing the flame-retardant particles by the collision force upon collision with the sidewall and shearing force, using rolls, a kneader, a Banbury mixer, an intermixer, a uniaxial extruder, or a biaxial extruder.

The kneading temperature varies depending on the matrix resin to be used, the amount of the flame-retardant particles to be added, and the like, but is preferably in the range of 50 to 450° C., more preferably in the range of 60 to 380° C.

In addition, the surface-coated flame-retardant particles according to the invention have an organic layer on their surface. Accordingly, the surface-coated flame-retardant particles can be dispersed uniformly in the resin not only by mechanical mixing by a kneader, biaxial extruder, roll mill, or the like, but also in a solution wherein the matrix resin is dissolved or swelled.

The flame-retardant particles may be mixed with the matrix resin together with a polymerization solvent during the polymerization of the resin in the production of the resin composition. Therefore, there is higher degree of freedom in dispersing the flame-retardant particles in the resin, and it is possible to impart flame-resistance and to maintain the mechanical strength by addition of a small amount of the flame-retardant particles. Accordingly, the flame-retardant particles of the invention are supposed to provide improved processability. Accordingly, the flame-retardant particles may be applied to various processing methods for production of a variety of products including pellets, fibers, films, sheets, and structural parts.

The solvent for solubilizing the matrix resin and the polymerization solvent are not particularly limited, and examples thereof include methanol, ethylformamide, nitromethane, ethanol, acrylic acid, acetonitrile, aniline, cyclohexanol, n-butanol, methylamine, n-amyl alcohol, acetone, methylethylketone, chloroform, benzene, ethyl acetate, toluene, diethylketone, carbon tetrachloride, benzonitrile, cyclohexane, isobutyl chloride, diethylamine, methylcyclohexane, isoamyl acetate, n-octane, n-heptane, isobutyl acetate, isopropyl acetate, methylisopropylketone, butyl acetate, methylpropylketone, ethylbenzene, xylene, tetrahydrofuran, trichloroethylene, methylethylketone, methylene chloride, pyridine, n-hexanol, isopropyl alcohol, dimethylformamide, nitromethane, ethylene glycol, glycerol formamide, dimethylformamide, and dimethylsulfoxide.

Only a single solvent may be used, or two or more solvents may be used.

The mixing temperature during mixing of the flame-retardant particles and the resin is preferably in the range of 0 to 200° C., more preferably room temperature to 150° C., particularly preferably 10 to 100° C. During the mixing, pressure may be applied in accordance with the necessity but the application of pressure is not essential.

In a preferable embodiment, after the kneading or the dispersing in the solution, the surface-coated flame-retardant particles are in the state of being uniformly dispersed in the flame-retardant resin composition such that the surface-coated flame-retardant particles are in the state of primary particles. The dispersion state may be easily confirmed by measuring the transmittance of ultraviolet or visible light through a sheet of the flame-retardant resin composition.

The measurement may be conducted as follows: 0.5 g of flame-retardant particles are dispersed in a solution of 10 g of an ethylene-vinyl acetate copolymer (EV260, manufactured by Du Pont-Mitsui Polychemicals) dissolved in 100 mL of tetrahydrofuran; the sample solution thus obtained is cast on a glass substrate and dried at 60° C. for hours to give a film having a thickness of 20 μm; and the transmittance of the film is measured by a ultraviolet-visible light spectrophotometer.

The transmittance measured by the above method is preferably in the range of 40 to 90%, more preferably in the range of 60 to 90%, at a wavelength of 550 nm.

EXAMPLES

Hereinafter, the present invention will be described in more detail with reference to Examples. However, it should be understood that the invention is not restricted by the Examples below.

First, examples of the method of producing surface-coated flame-retardant particles according to the invention will be described. In addition, the properties of the flame-retardant resin compositions prepared by using the surface-coated flame-retardant particles are also examined.

Example 1

(Preparation of Surface-coated Flame-retardant Particles A1)

Into a 2,000-ml separable flask containing 1,000 ml of ion-exchange water, 100 g (9.1 wt %) of sodium isostearate and 5 g of polypropylcellulose are added respectively as the organic compound metal salt and the dispersant and dissolved under heat. After the solution is cooled to room temperature, 50 g of complex magnesium hydroxide-aluminum hydroxide particles (MgAl$_x$-(OH)$_y$, wherein x is 2 and y is 8) having a volume-average diameter of 478 nm are added thereto as the flame-retardant particles (dispersion concentration: 45.2 wt %), and the mixture is stirred and ultrasonicated, to give a dispersion liquid.

Then, to the dispersion liquid under stirring and ultrasonication, 200 ml of 2 wt % hydrochloric acid is added dropwise at a velocity of 200 ml/hr. After dropwise addition of hydrochloric acid, the dispersion liquid turns into a magnesium hydroxide-aluminum hydroxide sol. Then, the magnesium hydroxide-aluminum hydroxide sol is dissolved in toluene, and the sol is precipitated in a centrifugal separator. The precipitate is dried in a vacuum dryer, to give surface-coated flame-retardant particles A1.

The surface-coated flame-retardant particles A1 have a volume-average particle diameter of 478 nm and a degree of dispersion of 0.5. The surface-coating amount as determined by weighing the surface-coated flame-retardant particles A1 accurately is 30 wt %, and the uniformity of the coated layer is confirmed by observation under a transmission electron microscope (FEI Company TecnaiG2).

(Preparation of Flame-retardant Resin Composition)

The surface-coated flame-retardant particles A1 and various resins (polycarbonate resin S-2000, manufactured by Mitsubishi Engineering Plastics Corp.; and ABS resin 600, manufactured by Techno Polymer Co., Ltd.) are weighed and mixed as shown in Table 1; and then, the mixture is kneaded by using a biaxial extruder into a strand, which is cut while hot, to give chips of the flame-retardant resin composition. The obtained chips are molded in a heating press (120° C. for 10 minutes), to give molded sheets of 2 mm in thickness.

(Evaluation of Flame-retardant Resin Composition)

Each of the molded sheets prepared above is evaluated as follows:

Flame Resistance Test

The flame resistance test is performed according to the vertical flame test specified by JIS Z2391 (which is incorporated herein by reference). The test is performed by using a sample having a thickness of 2 mm. The results are classified into V0, V1, or V2 (V0 is better than V1 and V1 is better than V2), or "unacceptable" if the sample is worse than the above ranks.

Mechanical Strength Test

In the mechanical strength tests, the tensile modulus, the tensile strength, and the breaking elongation of the sample are determined according to JIS K7161 (which is incorporated by reference herein) by using an autograph (V1-C, manufacture by Toyoseiki Seisaku-sho) at normal temperature and a stress rate of 50 mm/min.

Light Transmittance

The total light transmittance is determined according to JIS K7105 (which is incorporated herein by reference) using a hazemeter manufactured by Nippon Denshoku Co. Ltd. The size of the samples is 100 mm×100 mm×20 μm.

A sample solution obtained by dispersing 0.5 g the flame-retardant particles in a solution of 10 g of ethylene-vinyl acetate copolymer (manufactured by Du Pont-Mitsui Polychemicals EV260) in 100 ml of tetrahydrofuran is cast on a glass plate, and dried at 60° C. for 3 hours to give a film having a thickness of 20 μm. The transmittance of the film is confirmed in the hazemeter.

The results are summarized in Table 1.

Example 2

(Preparation of Surface-coated Flame-retardant Particles B1)

To a 2,000 ml separable flask containing 1,000 ml of ethanol, 100 g (9.1 wt %) of sodium isostearate and 5 g of polypropylcellulose are added respectively as the organic compound metal salt and the dispersant, and dissolved under heat. After the solution is cooled to room temperature, 50 g of complex magnesium hydroxide-aluminum hydroxide particles (MgAlx-(OH)y, wherein x is 1 and y is 4) having a volume-average diameter of 478 nm are added thereto (dispersion concentration: 45.2 wt %) as the flame-retardant particles, and the mixture is stirred and ultrasonicated to give a dispersion liquid.

Then, to the dispersion liquid under stirring and ultrasonication, 200 ml of ion-exchange water is added dropwise at a velocity of 200 ml/hr. After dropwise addition of ion-exchange water, the dispersion liquid turns into a magnesium hydroxide-aluminum hydroxide sol. Then, the obtained magnesium hydroxide-aluminum hydroxide sol is dissolved in toluene, and the sol is precipitated in a centrifugal separator. The precipitate is dried in a vacuum dryer to give surface-coated flame-retardant particles B1.

The surface-coated flame-retardant particles B1 have a volume-average particle diameter of 478 nm and a degree of dispersion of 0.5. The surface-coating ratio as determined by weighing the surface-coated flame-retardant particles B1 accurately is 35 wt %, and the uniformity of the coated layer is confirmed by observation under a transmission electron microscope.

(Preparation and Evaluation of Flame-retardant Resin Composition)

After blending the surface-coated flame-retardant particles B1 and a matrix resin as shown in Table 1, a molded sheet is prepared and evaluated in the same manner as in Example 1. The results are summarized in Table 1.

Comparative Example 1

A molded sheet is prepared and evaluated in the same manner as in Example 1, except that the flame-retardant particles are not blended in preparation of the flame-retardant resin composition. The results are summarized in Table 1.

Comparative Example 2

(Preparation of Surface-coated Flame-retardant Particles C1)

Surface-coated flame-retardant particles C1 are prepared in the same manner as in Example 1, except that the complex magnesium hydroxide-aluminum hydroxide particles having a volume-average diameter of 478 nm is replaced by magnesium hydroxide particles having a volume-average diameter of 2,000 nm, that the amount of sodium isostearate used is changed to 200 g, that 0.1 g of polyvinylalcohol is used as the dispersant instead of 5 g of polypropylcellulose, and that the hydrochloric acid was added dropwise at a velocity of 40 ml/hr.

The surface-coated flame-retardant particles C1 have a volume-average particle diameter of 2,000 nm and a degree of dispersion of 0.5. The surface-coating amount as determined by weighing the surface-coated flame-retardant particles C1 accurately is 5 wt %, and generation of uncoated areas is confirmed by observation under a transmission electron microscope.

(Preparation and Evaluation of Flame-retardant Resin Composition)

After blending the surface-coated flame-retardant particles C1 with a matrix resin as shown in Table 1, a molded sheet is prepared and evaluated in the same manner as in Example 1. The results are summarized in Table 1.

Comparative Example 3

(Preparation of Surface-coated Flame-retardant Particle C2)

Surface-coated flame-retardant particles C2 are prepared in the same manner as in Example 1, except that the amount of sodium isostearate is changed to 50 g (4.8 wt %), that the dispersant is not used, and that hydrochloric acid is added dropwise at a velocity of 250 ml/hr.

The surface-coated flame-retardant particles C2 have a volume-average particle diameter of 478 nm and a degree of dispersion of 6.0. The surface-coating ratio determined by weighing the surface-coated flame-retardant particles C2 accurately is 20 wt %, and aggregation of particles is confirmed by observation under a transmission electron microscope.

(Preparation and Evaluation of Flame-retardant Resin Composition)

After blending the surface-coated flame-retardant particles C2 with a matrix resin as shown in Table 1, a molded sheet is prepared and evaluated in the same manner as in Example 1. The results are summarized in Table 1.

Comparative Example 4

A molded sheet is prepared and evaluated in the same manner as in Example 1, except that the flame-retardant particles A1 used in preparation of the flame-retardant resin composition is replaced by flame-retardant particles D1, which are untreated magnesium hydroxide particles having a volume-average diameter of 80 nm (Magnesia 500H, manufactured by Ube Material Industries, Ltd.). The results are summarized in Table 1.

Example 3

(Preparation of Surface-coated Flame-retardant Particles E1)

To a 2,000-ml separable flask containing 1,000 ml of ion-exchange water, 5 g of polypropylcellulose (weight-average molecular weight: 100) is added as the dispersant, and dissolved under heat. After the solution is cooled to room temperature, 200 g of complex magnesium hydroxide-aluminum hydroxide particles (MgAl$_x$—(OH)$_y$, wherein x is 2 and y is 8) having a volume-average diameter of 478 nm is added thereto as the flame-retardant particle (dispersion concentration: 19.9 wt %), and the mixture is stirred and ultrasonicated to give a dispersion liquid.

Then, to the dispersion liquid under stirring and ultrasonication, 1,000 ml of an aqueous 10 wt % sodium L-glutamate solution is added dropwise at a velocity of 100 ml/hr and the mixture is stirred additionally for 60 minutes. The dispersion liquid is heated under reduced pressure and concentrated to approximately half volume. At the time, the dispersion liquid turns into a white magnesium hydroxide-aluminum hydroxide sol state. Then, a suitable amount of toluene is added to the magnesium hydroxide-aluminum hydroxide sol to dissolve the sol. Then, the aggregates therein are removed by filtration through a 10 μm-pore metal mesh. The toluene layer is then dried under reduced pressure to give surface-coated flame-retardant particles E1.

The surface-coated flame-retardant particles E1 have a volume-average particle diameter of 478 nm and a degree of dispersion of 0.5. The surface-coating amount as determined by weighing the surface-coated flame-retardant particles E1

TABLE 1

| | | Example 1 | | Example 2 | | Comparative Example 1 | | Comparative Example 2 | | Comparative Example 3 | | Comparative Example 4 | |
|---|---|---|---|---|---|---|---|---|---|---|---|---|---|
| Flame-retardant resin composition | Surface-coated flame retardant particle | A1 | A1 | B1 | B1 | — | — | C1 | C1 | C2 | C2 | D1 | D1 |
| | Blending amount | 5 parts | 5 parts | 5 parts | 5 parts | — | — | 5 parts | 5 parts | 5 parts | 5 parts | 5 parts | 5 parts |
| | Polycarbonate resin | 100 parts | | 100 parts | | 100 parts | | 100 parts | | 100 parts | | 100 parts | |
| | ABS resin | | 100 parts | | 100 parts | | 100 parts | | 100 parts | | 100 parts | | 100 parts |
| Total | | 105 parts | 105 parts | 105 parts | 105 parts | 100 parts | 100 parts | 105 parts | 105 parts | 105 parts | 105 parts | 105 parts | 105 parts |
| State | | | | | | | | | | Aggregation | Aggregation | Aggregation | Aggregation |
| Mechanical properties | Tensile strength (MPa) | 55 | 46 | 52 | 46 | 61 | 49 | 20 | 17 | Test impossible | Test impossible | Test impossible | Test impossible |
| | Tensile modulus (MPa) | 2280 | 2720 | 2240 | 2700 | 2400 | 2814 | 800 | 2150 | Test impossible | Test impossible | Test impossible | Test impossible |
| | Elongation (%) | 4.0 | — | 4.2 | — | 5.6 | — | 2.0 | — | Test impossible | Test impossible | Test impossible | Test impossible |
| Transmittance | Total light transmittance | >90% | — | >90 % | — | >90% | — | 60% | — | — | — | — | — |
| Flame resistance | Vertical flame test | V0 | V1 | V0 | V1 | Unacceptable | Unacceptable | Unacceptable | Unacceptable | Unacceptable | Unacceptable | Unacceptable | Unacceptable |

Polycarbonate resin: (PC, S-2000 manufactured by Mitsubishi Engineering Plastics Corp.)
ABS resin: (ABS 600, manufactured by Techno Polymer Co., Ltd.)
*Flame test: V0 is better than V1 and V1 is better than V2, "Unacceptable" refers to the state worse than V2.

accurately is 50 wt %, and uniformity of the coated layer is confirmed by observation under a transmission electron microscope (FEI Company TecnaiG2).
(Preparation and Evaluation of Flame-retardant Resin Composition)

A molded sheet is prepared and evaluated in a similar manner to Example 1, by blending the surface-coated flame-retardant particles E1 with a matrix resin as shown in Table 2. The results are summarized in Table 2.

Example 4

A molded sheet is prepared and evaluated in the same manner as in Example 3, except that the flame-retardant particles E1 and the matrix resin are used in the ratio shown in Table 2 in preparation of the flame-retardant resin composition. The results are summarized in Table 2.

Comparative Example 5

(Preparation of Surface-coated Flame-retardant Particles F1)

Surface-coated flame-retardant particles F1 are prepared in the same manner as in Example 3, except that the complex magnesium hydroxide-aluminum hydroxide particles having a volume-average diameter of 478 nm used in preparation of the surface-coated flame-retardant particles is replaced by 10 g of magnesium hydroxide particles having a volume-average diameter of 2,000 nm (at a dispersion concentration of 0.9 wt %), that 0.1 g of polyvinylalcohol is used as the dispersant instead of polypropylcellulose, and that the concentration of sodium L-glutamate is changed to 20 wt %.

The surface-coated flame-retardant particles F1 have a volume-average particle diameter of 2,000 nm and a degree of dispersion of 0.8. The surface-coating amount as determined by weighing the surface-coated flame-retardant particles F1 accurately is 5 wt %, and generation of uncoated areas is confirmed by observation under a transmission electron microscope.
(Preparation and Evaluation of Flame-retardant Resin Composition)

A molded sheet is prepared and evaluated in a similar manner to Example 1, by blending the surface-coated flame-retardant particles F1 with a matrix resin as shown in Table 2. The results are summarized in Table 2.

Example 5

(Preparation of Surface-coated Flame-retardant Particles G1)

5 g of magnesium chloride hexahydrate, 5 g of aluminum chloride hexahydrate, and 20 g of sodium n-dodecylsulfate are dissolved in 100 ml of ion-exchange water. The mixture is treated in a homogenizer at an agitating speed of 6,000 rpm, to give a metal soap emulsion (micellar structure). The emulsion is added to 1,000 ml of toluene (as an organic solvent), and the mixture is treated in a homogenizer at 3,000 rpm, to give a reverse micelle particle dispersion liquid.

Observation of the reverse micelle particles by a dynamic light scattering particle diameter distribution analyzer reveals that the reverse micelle particles have a spherical shape and their particle diameters are approximately 100 nm. Then, 100 g of an aqueous 25 wt % ammonia water is added to the micelle dispersion liquid while the micelle dispersion liquid is stirred, to give metal hydrates. Finally, the reaction solution is heated under reduced pressure to remove the solvent, and dried with a vacuum dryer, to give white surface-coated flame-retardant particles G1.

The surface-coated flame-retardant particles G1 are white spherical particles of a composite of magnesium hydroxide and aluminum hydroxide having a surfactant-derived coating layer formed on a surface thereof and having a volume-average particle diameter of 80 nm and a degree of dispersion of 0.3. The surface-coating amount as determined by weighing the surface-coated flame-retardant particles G1 accurately is 50 wt %, and uniformity of the coated layer is confirmed by observation under a transmission electron microscope.
(Preparation and Evaluation of Flame-retardant Resin Composition)

A molded sheet is prepared and evaluated in a similar manner to Example 1, by blending the surface-coated flame-retardant particles G1 with a matrix resin as shown in Table 4. The results are summarized in Table 4.

Examples 6 to 13

Surface-coated flame-retardant particles G2 to G6 are prepared in the same manner as in Example 1, except that the compositions and the conditions shown in Table 3 are used for production of the surface-coated flame-retardant particles. The compositions and the properties are summarized in Table 3.

TABLE 2

| | | Example 3 | | Example 4 | | Comparative Example 5 | |
|---|---|---|---|---|---|---|---|
| Flame-retardant resin composition | Surface-coated flame-retardant particle | E1 | E1 | E1 | E1 | F1 | F1 |
| | Blending amount | 5 parts | 5 parts | 2 parts | 10 parts | 5 parts | 5 parts |
| | Polycarbonate resin | 100 parts | | | | 100 parts | |
| | ABS resin | | 100 parts | 100 parts | 100 parts | | 100 parts |
| Total | | 105 parts | 105 parts | 102 parts | 110 parts | 105 parts | 105 parts |
| Mechanical properties | Tensile strength (MPa) | 55 | 46 | 45 | 48 | 20 | 17 |
| | Tensile modulus (MPa) | 2280 | 2720 | 2680 | 2800 | 800 | 2150 |
| | Elongation (%) | 4.0 | — | — | — | 2.0 | — |
| Transmittance | Total light transmittance | >90% | — | — | — | 60% | — |
| Flame resistance | Vertical flame test | V0 | V1 | V2 | V1 | Unacceptable | Unacceptable |

Polycarbonate resin: (PC, S-2000 manufactured by Mitsubishi Engineering Plastics Corp.)
ABS resin: (ABS 600, manufactured by Techno Polymer Co., Ltd.)
*Flame test: V0 is better than V1 and V1 is better than V2, "Unacceptable" refers to the state worse than V2.

TABLE 3

| Surface-coated flame-retardant particle | | G1 | G2 | G3 | G4 | G5 | G6 | H1 |
|---|---|---|---|---|---|---|---|---|
| Metal salt | Type | Magnesium chloride hexahydrate-aluminum hydroxide hexahydrate | Magnesium chloride hexahydrate-Aluminum chloride hexahydrate | Magnesium chloride hexahydrate-Aluminum chloride hexahydrate | Magnesium chloride hexahydrate-Zinc chloride hexaydrate | Magnesium chloride hexahydrate-Calcium chloride hexahydrate | Magnesium chloride hexahydrate-aluminum chloride hexahydrate-calcium chloride hexahydrate | Magnesium chloride hexyhydrate-aluminum chloride hexahydrate |
| | Amount | 5 g/5 g | 5 g/5 g | 5 g/5 g | 7 g/3 g | 7 g/3 g | 5 g/3 g/2 g | 100 g/100 g |
| Surfacant | Type | Sodium n-dodecyl-sulfate | Sodium n-dodecyl-sulfate | Sodium n-dodecyl-sulfate | Sodium isostearate | Sodium isostearate | Sodium isostearate | Sodium n-dodecyl-sulfate |
| | Amount | 20 g | 30 g | 10 g | 20 g | 20 g | 20 g | 20 g |
| Diameter of reverse micelle particals | | 100 nm | 10 nm | 450 nm | 200 nm | 330 nm | 480 nm | 600 nm |
| Flame-retardant particle | Composition | Complex salt of magnesium hydroxide-aluminum hydroxide | Complex salt of magnesium hydroxide-aluminum hydroxide | Complex salt of magnesium hydroxide-aluminum hydroxide | Complex salt of magnesium hydroxide-zinc hydroxide | Complex salt of magnesium hydroxide-calcium hydroxide | Complex salt of magnesium hydroxide-aluminum hydroxide-calcium hydroxide | Complex salt of magnesium hydroxide-aluminum hydroxide |
| | Particle diameter (mm) | 80 nm | 5 nm | 400 nm | 160 nm | 300 nm | 450 nm | 1000 |
| Coating amount | | 50% | 80% | 20% | 40% | 40% | 30% | 5% |

In addition, molded sheets having the compositions shown in Table 4 are prepared by using these surface-coated flame-retardant particles G2 to G6, and the obtained molded sheets are evaluated with respect to the evaluation items shown in Table 4. The results are summarized in Table 4.

TABLE 4

| | | Example 5 | | Example 6 | | Example 7 | | Example 8 | | Example 9 | |
|---|---|---|---|---|---|---|---|---|---|---|---|
| Complex surface-coated flame-retardant particle | Type | G1 | G1 | G2 | G2 | G3 | G3 | G4 | G4 | G5 | G5 |
| | Blending amount | 5 parts | 5 parts | 5 parts | 5 parts | 5 parts | 5 parts | 5 parts | 5 parts | 5 parts | 5 parts |
| Resin | Polycarbonate resin | 100 parts | | 100 parts | | 100 parts | | 100 parts | | 100 parts | |
| | ABS resin | | 100 parts | | 100 parts | | 100 parts | | 100 parts | | 100 parts |
| Total | | 105 parts | 105 parts | 105 parts | 105 parts | 105 parts | 105 parts | 105 parts | 105 parts | 105 parts | 105 parts |
| Mechanical properties | Yield stress (MPa) | 60 | 50 | 62 | 51 | 55 | 46 | 58 | 49 | 60 | 50 |
| | Flexural modulus (MPa) | 2420 | 2850 | 2440 | 2990 | 2280 | 2720 | 2400 | 2800 | 2400 | 2900 |
| | Elongation (%) | 6.0 | — | 6.1 | — | 4.0 | — | 6.0 | — | 6.0 | — |
| Transmittance | Total light transmittance | >90% | — | >90% | — | >90% | — | >90% | — | >90% | — |
| Flame resistance | Vertical flame test | V0 | V1 | V0 | V1 | V0 | V1 | V0 | V1 | V0 | V1 |

| | | Example 10 | | Example 11 | | Example 12 | | Example 13 | |
|---|---|---|---|---|---|---|---|---|---|
| Complex surface-coated flame-retardant particle | Type | G6 | G6 | G1 | G1 | G2 | G2 | G3 | G3 |
| | Blending amount | 5 parts | 5 parts | 2 parts | 10 parts | 2 parts | 10 parts | 2 parts | 10 parts |
| Resin | Polycarbonate resin | 100 parts | | | | | | | |
| | ABS resin | | 100 parts | 100 parts | 100 parts | 100 parts | 100 parts | 100 parts | 100 parts |
| Total | | 105 parts | 105 parts | 102 parts | 110 parts | 102 parts | 110 parts | 102 parts | 110 parts |

TABLE 4-continued

| | | | | | | | | | |
|---|---|---|---|---|---|---|---|---|---|
| Mechanical properties | Yield stress (MPa) | 52 | 46 | 48 | 55 | 48 | 53 | 450 | 480 |
| | Flexural modulus (MPa) | 2240 | 2700 | 2800 | 2950 | 2900 | 3020 | 68 | 80 |
| | Elongation (%) | 4.2 | — | — | — | — | — | — | — |
| Transmittance | Total light transmittance | >90% | — | — | — | — | — | — | — |
| Flame resistance | Vertical flame test | V0 | V1 | V2 | V1 | V1 | V1 | V2 | V1 |

Polycarbonate resin: (PC, S-2000 manufactured by Mitsubishi Engineering Plastics Corp.)
ABS resin: (ABS 600, manufactured by Techno Polymer Co., Ltd.)
*Flame test: V0 is better than V1 and V1 is better than V2, ""Unacceptable" refers to the state worse than V2.

Comparative Examples 6 and 7

Surface-coated flame-retardant particles H1 are prepared in the same manner as in Example 1, except that the compositions and the conditions shown in Table 3 are used for production of the surface-coated flame-retardant particles. The compositions and the properties are summarized in Table 3. In addition, molded sheets having the compositions shown in Table 5 are prepared by using the surface-coated flame-retardant particles H1, and evaluated with respect to the evaluation items shown in Table 5. The results are summarized in Table 5.

TABLE 5

| | | Comparative Example 6 | | Comparative Example 7 | |
|---|---|---|---|---|---|
| Complex surface-coated flame-retardant particle | Type | H1 | H1 | H1 | H1 |
| | Blending amount | 5 parts | 20 parts | 5 parts | 20 parts |
| | Polycarbonate resin | 100 parts | 100 parts | | |
| Resin | ABS resin | | | 100 parts | 100 parts |
| Total | | 105 parts | 120 parts | 105 parts | 120 parts |
| Mechanical properties | Yield stress (MPa) | 20 | 15 | 17 | 14 |
| | Flexural modulus (MPa) | 800 | 600 | 2150 | 2100 |
| | Elongation (%) | 2.0 | 1.5 | — | — |
| Transmittance | Total light transmittance | 60% | 40% | — | — |
| Flame resistance | Vertical flame test | Unacceptable | Unacceptable | Unacceptable | V2 |

Polycarbonate resin: (PC, S-2000 manufactured by Mitsubishi Engineering Plastics Corp.)
ABS resin: (ABS 600, manufactured by Techno Polymer Co., Ltd.)
*Flame test: V0 is better than V1 and V1 is better than V2, ""Unacceptable" refers to the state worse than V2.

Example 14

(Preparation of Surface-coated Flame-retardant Particles I1)

To a solution of 10 g of magnesium oleate (25016-01, manufactured by Kanto Kagaku) in 100 ml of toluene (concentration: 10.3 wt %), 25 ml of an aqueous 10 wt % magnesium chloride solution and 25 ml of an aqueous 10 wt % aluminum chloride solution are added dropwise simultaneously at a velocity of 5 ml/hr. Additionally, 10 ml of an aqueous 28 wt % ammonia water solution is added thereto dropwise at a velocity of 10 ml/hr to give a composite aluminum hydroxide-magnesium hydroxide sol. The sol is centrifuged in a centrifugal separator at 5,000 rpm for 10 minutes to be spun down. The precipitate is dried in a vacuum dryer to give 4.57 g of a magnesium hydroxide sol (surface-coated flame-retardant particles I1).

The obtained sol is redispersed in toluene, and analysis of the particles in a laser Doppler particle diameter distribution analyzer shows a volume-average particle diameter of 108 nm and a degree of dispersion of 0.8. Observation of the sol under a transmission electron microscope (FEI Company TecnaiG2) reveals that the surface-coated flame-retardant particles I1 are spherical in shape and have a uniform coating layer (coating amount: 55 wt %). Separate thermal analysis indicates that the sol has a water content of 27 wt %.

The surface-coated flame-retardant particles I1 have a volume-average particle diameter of 108 nm and a degree of dispersion of 0.8. The surface-coating amount as determined by weighing the surface-coated flame-retardant particles I1 accurately is 55 wt and the uniformity of the coated layer is confirmed by observation under a transmission electron microscope.

(Preparation and Evaluation of Flame-retardant Resin Composition)

Separately, molded sheets having the compositions shown in Table 6 are prepared by using these surface-coated flame-retardant particles I1 and evaluated with respect to the evaluation items shown in Table 6. The results are summarized in Table 6.

Comparative Examples 8 and 9

Untreated magnesium hydroxide particles having a volume-average diameter of 1,000 nm (Kisuma 5, manufactured by Kyowa Chemical Industries) is used as the surface-coated flame-retardant particles J1.

(Preparation and Evaluation of Flame-retardant Resin Composition)

Molded sheets having the compositions shown in Table 6 are prepared by using the surface-coated flame-retardant particles J1, and evaluated with respect to the evaluation items shown in Table 6. The results are summarized in Table 6.

TABLE 6

|  |  | Example 14 | | Comparative Example 8 | | Comparative Example 9 | |
|---|---|---|---|---|---|---|---|
| Complex surface-coated flame-retardant particle | Type | L1 | L1 | L1 | J1 | J1 | J1 |
|  | Blending amount | 10 parts | 10 parts | 50 parts | 100 parts | 10 parts | 50 parts |
| Resin | Polycarbonate resin |  | 100 parts |  |  | 100 parts |  |
|  | ABS resin | 100 parts |  | 100 parts | 100 parts |  | 100 parts |
| Total |  | 110 parts | 110 parts | 150 parts | 200 parts | 110 parts | 150 parts |
| Mechanical properties | Yield stress (MPa) | 72.2 | 80.1 | 52.7 | 54.3 | 75.2 | Molding is impossible due to foaming |
|  | Flexural modulus (MPa) | 2161 | 3650 | 3218 | 3482 | 3201 |  |
|  | Elongation (%) | — | 0.8 | — | — | 3.8 |  |
| Transmittance | Total light transmittance | — | 90.8% | — | — | 64% |  |
| Flame resistance | Vertical flame test | V2 | V1 | Unacceptable | V2 | V2 |  |

Polycarbonate resin: (PC, S-2000 manufactured by Mitsubishi Engineering Plastics Corp.)
ABS resin: (ABS 600, manufactured by Techno Polymer Co., Ltd.)
*Flame test: V0 is better than V1 and V1 is better than V2, "Unacceptable" refers to the state worse than V2.

Example 15

(Preparation of Surface-coated Flame-retardant Resin Particles K1)

100 g of composite magnesium hydroxide-aluminum hydroxide particles (MgAlx-(OH)y, wherein x is 2 and y is 8) having a volume-average diameter of 478 nm as the flame-retardant particles and 200 g of octamethylcyclotetrasiloxane as the cyclic organosiloxane compound are put respectively in separate glass containers. These containers are placed in a desiccator capable of sealing and of reducing the internal pressure. Then, the internal pressure of the desiccator is reduced to 80 mmHg by a vacuum pump, and the desiccator is sealed tightly. The desiccator is then left in an environment at 60° C. for 12 hours, and the reaction is allowed to proceed. After the reaction, the surface-coated flame-retardant particles K1 are taken out of the glass container.

The surface-coated flame-retardant particles K1 thus obtained have a volume-average particle diameter of 478 nm and a degree of dispersion of 0.5. The surface-coating amount as determined by weighing the surface-coated flame-retardant particles K1 accurately is 20 wt %, and the uniformity of the coated layer is confirmed by observation under a transmission electron microscope.

(Preparation and Evaluation of Flame-retardant Resin Composition)

Molded sheets having the compositions shown in Table 8 are prepared by using the surface-coated flame-retardant particles K1, and evaluated with respect to the evaluation items shown in Table 8. The results are summarized in Table 8.

Examples 16 and 17

(Preparation of Surface-coated Flame-retardant Particles K2 and K3)

Surface-coated flame-retardant particles K2 to K3 are prepared in the same manner as in Example 15, except that the compositions and the conditions shown in Table 7 are used in preparation of the surface-coated flame-retardant particles. The conditions are also shown in Table 7.

TABLE 7

| Surface-coated flame-retardant particle |  | K1 | K2 | K3 | L1 |
|---|---|---|---|---|---|
| Flame-retardant particle | Composition | Magnesium hydroxide-aluminum hydroxide | Magnesium hydroxide-zinc hydroxide | Magnesium hydroxide-iron hydroxide | Magnesium hydroxide |
|  | Volume-average diameter | 478 nm | 300 nm | 400 nm | 2000 nm |
|  | Amount | 100 g | 100 g | 100 g | 200 g |
| Cyclic organosiloxane | Composition | Octamethylcyclo tetrasiloxane | Octamethylcyclo tetrasiloxane | Octamethylcyclo tetrasiloxane | Octamethylcyclo tetrasiloxane |
|  | Amount | 200 g | 200 g | 200 g | 200 g |
| Processing condition | Pressure | 80 mmHg | 80 mmHg | 80 mmHg | 80 mmHg |
|  | Temperature | 60° C. | 60° C. | 60° C. | 60° C. |
|  | Period | 12 hours | 12 hours | 12 hours | 12 hours |
| Coating amount (wt %) |  | 20 | 30 | 25 | 10 |

(Preparation and Evaluation of Flame-retardant Resin Composition)

Molded sheets having the compositions shown in Table 8 are prepared by using these surface-coated flame-retardant particles K1 and K2 and evaluated with respect to the evaluation items shown in Table 8. The results are summarized in Table 8.

Comparative Example 10

(Preparation of Surface-coated Flame-retardant Particles L1)

Surface-coated flame-retardant particles L1 are prepared in the same manner as in Example 15, except that the complex magnesium hydroxide -aluminum hydroxide particles having a volume-average diameter of 478 nm are replaced by 200 g of magnesium hydroxide particles having a volume-average diameter of 2,000 nm.

The surface-coated flame-retardant particles L1 have a volume-average particle diameter of 2,000 nm and a degree of dispersion of 6.0. The surface-coating amount as determined by weighing the surface-coated flame-retardant particles L1 accurately is 10 wt %, and generation of uncoated areas is confirmed by observation under a transmission electron microscope.

(Preparation and Evaluation of Flame-retardant Resin Composition)

Molded sheets having the compositions shown in Table 8 are prepared by using these surface-coated flame-retardant particles L1 and evaluated with respect to the evaluation items shown in Table 8. The results are summarized in Table 8.

method thereof. The invention further provides a surface-coated flame-retardant particle having a uniform coated layer that has a larger specific surface area which realizes a larger contact area with the polymer, a flame-retardant resin composition using the same, and production methods thereof.

What is claimed is:

1. Surface-coated flame-retardant particles comprising a flame-retardant grain and a coated layer provided on a surface of the flame-retardant grain,
    wherein the coated layer comprises an organic compound which has a binding group for combining with the flame-retardant grains at its terminal, or a polysilicone, the flame-retardant grain comprises a complex metal hydrate and has a volume average particle diameter of 1 to 500 nm, and the complex metal hydrate is represented by $MgM_x\text{-}(OH)_y$, wherein M represents one or more metals selected from the group consisting of Ca, Al, Fe, Zn, Ba, Cu, and Ni, x is a real number of 0.1 to 10, and y is an integer of 2 to 32; and
    wherein the surface-coated flame-retardant particles have a degree of dispersion from 0.1 to 3.0, the degree of dispersion being defined by the following Formula (1):

Degree of dispersion=$\log(D_{90}/D_{10})$ where:
    in a plot of a mass weighted cumulative distribution of the particles against particle weight from the smaller particle diameter side,
    the particle diameter at which the cumulative distribution reaches the 90% point is designated as $D_{90}$; and

TABLE 8

|  |  | Example 15 | Example 16 | Example 17 | Comparative Example 10 | |
|---|---|---|---|---|---|---|
| Complex surface-coated flame-retardant particle | Type | K1 | K2 | K3 | L1 | L1 |
|  | Blending amount | 5 parts | 5 parts | 5 parts | 5 parts | 5 parts |
| Resin | Polycarbonate resin |  |  |  | 100 parts |  |
|  | ABS resin | 100 parts | 100 parts | 100 parts |  | 100 parts |
| Total |  | 105 parts | 105 parts | 105 parts | 105 parts | 105 parts |
|  | Yield stress (MPa) | 49 | 48 | 49 | 20 | 17 |
| Mechanical properties | Flexural modulus (MPa) | 2820 | 2800 | 2820 | 800 | 2150 |
|  | Elongation (%) | — | — | — | 2 | — |
| Transmittance | Total light transmittance | — | — | — | 60% | — |
| Flame resistance | Vertical flame test | V1 | V1 | V1 | Unacceptable | Unacceptable |

Polycarbonate resin: (PC, S-2000 manufactured by Mitsubishi Engineering Plastics Corp.)
ABS resin: (ABS 600, manufactured by Techno Polymer Co., Ltd.)
*Flame test: V0 is better than V1 and V1 is better than V2, ""Unacceptable" refers to the state worse than V2.

As is apparent from the results above, flame-retardant resin compositions containing the surface-coated flame-retardant particles according to the invention are higher in flame resistance and show more transparent appearance without deterioration of their mechanical characteristics. In addition, the flame-retardant resin compositions retain their superior flame resistance as well as mechanical characteristics, even when used in combination with other usual flame retardants (flame-retardant compounds).

As described above, the invention provides a new flame-retardant resin composition which retains sufficient mechanical physical characteristics and which cause a smaller environment load, a surface-coated flame-retardant particle for use therein, and methods of producing the same. In other words, the inventions also provides a flame-retardant particle needed for producing a new inorganic flame retardant which shows a flame resistance equivalent to that of organic flame-retardant compounds and which does no deteriorate the physical characteristics of the polymer, and a production the particle diameter at which the cumulative distribution reaches the 10% point is designated as $D_{10}$.

2. A flame-retardant resin composition comprising a matrix resin and surface-coated flame-retardant particles mixed with the matrix resin,
    wherein the surface-coated flame-retardant particles each comprise a flame-retardant grain and a coated layer provided on a surface of the flame-retardant grain, the coated layer comprises an organic compound which has a binding group for combining with the flame-retardant grains at its terminal, or a polysilicone, the flame-retardant grains comprise a complex metal hydrate and have a volume average particle diameter of 1 to 500 nm, and the complex metal hydrate is represented by $MgM_x\text{-}(OH)_y$, wherein M represents one or more metals selected from the group consisting of Ca, Al, Fe, Zn, Ba, Cu, and Ni, x is a real number of 0.1 to 10, and y is an integer of 2 to 32; and wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:
in a plot of a mass weighted cumulative distribution of the particles against particle weight from the smaller particle diameter side,
the particle diameter at which the cumulative distribution reaches the 90% point is designated as $D_{90}$; and
the particle diameter at which the cumulative distribution reaches the 10% point is designated as $D_{10}$.

3. A method of producing surface-coated flame-retardant particles, the method comprising:
forming a dispersion liquid by dispersing flame-retardant grains in an aqueous solution in which a metal salt of an organic compound and a dispersant are dissolved; and
forming a coated layer by depositing the organic compound on the flame-retardant grains by adding an acidic aqueous solution to the dispersion liquid,
wherein the flame-retardant grains comprise a complex metal hydrate and have a volume average particle diameter of 1 to 500 nm, and the complex metal hydrate is represented by $MgM_x\text{-}(OH)_y$, wherein M represents one or more metals selected from the group consisting of Ca, Al, Fe, Zn, Ba, Cu, and Ni x is a real number of 0.1 to 10, and y is an integer of 2 to 32; and
wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:
in a plot of a mass weighted cumulative distribution of the particles against particle weight from the smaller particle diameter side,
the particle diameter at which the cumulative distribution reaches the 90% point is designated as $D_{90}$; and
the particle diameter at which the cumulative distribution reaches the 10% point is designated as $D_{10}$.

4. A method of producing surface-coated flame-retardant particles, the method comprising:
forming a dispersion liquid by dispersing flame-retardant grains in a solution in which an organic compound and a dispersant are dissolved in an organic solvent miscible with water; and
forming a coating layer by depositing the organic compound on a surface of the flame-retardant grains by adding water to the dispersion liquid,
wherein the flame-retardant grains comprise a complex metal hydrate and have a volume average particle diameter of 1 to 500 nm, and the complex metal hydrate is represented by $MgM_x\text{-}(OH)_y$, wherein M represents one or more metals selected from the group consisting of Ca, Al, Fe, Zn, Ba, Cu, and Ni x is a real number of 0.1 to 10, and y is an integer of 2 to 32; and
wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:
in a plot of a mass weighted cumulative distribution of the particles against particle weight from the smaller particle diameter side,
the particle diameter at which the cumulative distribution reaches the 90% point is designated as $D_{90}$; and
the particle diameter at which the cumulative distribution reaches the 10% point is designated as $D_{10}$.

5. A method of producing surface-coated flame-retardant particles, the method comprising:
forming a dispersion liquid by dispersing flame-retardant grains in an aqueous solution in which a dispersant is dissolved; and
adding an aqueous solution of a salt of a polyamino acid to the dispersion liquid so as to form a coating layer through deposition of the polyamino acid on the flame-retardant grains,
wherein the flame-retardant grains comprise a complex metal hydrate and have a volume average particle diameter of 1 to 500 nm, and the complex metal hydrate is represented by $MgM_x\text{-}(OH)_y$, wherein M represents one or more metals selected from the group consisting of Ca, Al, Fe, Zn, Ba, Cu, and Ni x is a real number of 0.1 to 10, and y is an integer of 2 to 32; and
wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:
in a plot of a mass weighted cumulative distribution of the particles against particle weight from the smaller particle diameter side,
the particle diameter at which the cumulative distribution reaches the 90% point is designated as $D_{90}$; and
the particle diameter at which the cumulative distribution reaches the 10% point is designated as $D_{10}$.

6. A method of producing surface-coated flame-retardant particles, the method comprising:
forming metal soap particles having a micelle structure or a vesicle structure by dissolving a surfactant and a metal salt including $MgM_x\text{-}(OH)_y$, wherein M represents one or more metals selected from the group consisting of Ca, Al, Fe, Zn, Ba, Cu, and Ni, x is a real number of 0.1 to 10, and y is an integer of 2 to 32, in water;
converting the metal soap particles to reverse micelle particles by suspending the metal soap particles in an organic solvent; and
forming a complex metal hydroxide by allowing the metal ion contained in the reverse micelle particles to react with a base;
wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:
in a plot of a mass weighted cumulative distribution of the particles against particle weight from the smaller particle diameter side,
the particle diameter at which the cumulative distribution reaches the 90% point is designated as $D_{90}$; and
the particle diameter at which the cumulative distribution reaches the 10% point is designated as $D_{10}$.

7. A method of producing surface-coated flame-retardant particles, the method comprising:
forming a suspension liquid obtained by suspending a metal salt of an organic compound in an organic solvent; and forming a complex metal hydroxide by allowing the metal ion contained in the metal salt of the organic compound to react with a base, wherein the metal salt of the organic compound includes $MgM_x\text{-}(OH)_y$, wherein M represents one or more metals selected from the group consisting of Ca, Al, Fe, Zn, Ba, Cu, and Ni, x is a real number of 0.1 to 10, and y is an integer of 2 to 32; and wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:

in a plot of a mass weighted cumulative distribution of the particles against particle weight from the smaller particle diameter side, the particle diameter at which the cumulative distribution reaches the 90% point is designated as $D_{90}$; and the particle diameter at which the cumulative distribution reaches the 10% point is designated as $D_{10}$.

8. A method of producing surface-coated flame-retardant particles, the method comprising:

forming a first aqueous solution in which a dispersant or chelate compound, and a metal salt of an organic compound are dissolved;

adding a second aqueous solution of a metal ion to the first aqueous solution; and forming a complex metal hydroxide by adding a base to the mixed aqueous solution containing the metal ion, wherein the metal salt of the organic compound includes $MgM_x\text{-}(OH)_y$, wherein M represents one or more metals selected from the group consisting of Ca, Al, Fe, Zn, Ba, Cu, and Ni, x is a real number of 0.1 to 10, and y is an integer of 2 to 32; and wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:

in a plot of a mass weighted cumulative distribution of the particles against particle weight from the smaller particle diameter side, the particle diameter at which the cumulative distribution reaches the 90% point is designated as $D_{90}$; and the particle diameter at which the cumulative distribution reaches the 10% point is designated as $D_{10}$.

9. A method of producing surface-coated flame-retardant particles, the method comprising treating flame-retardant grains having a volume average particle diameter of 1 to 500 nm with vapor of a cyclic organosiloxane compound so as to allow the cyclic organosiloxane compound to undergo ring-opening polymerization on the flame-retardant grains and so as to form a coating layer on the flame-retardant grains, wherein the flame-retardant grains comprise a complex metal hydrate is represented by $MgM_x\text{-}(OH)_y$, wherein M represents one or more metals selected from the group consisting of Ca, Al, Fe, Zn, Ba, Cu, and Ni x is a real number of 0.1 to 10, and y is an integer of 2 to 32; and wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:

in a plot of a mass weighted cumulative distribution of the particles against particle weight from the smaller particle diameter side, the particle diameter at which the cumulative distribution reaches the 90% point is designated as $D_{90}$; and the particle diameter at which the cumulative distribution reaches the 10% point is designated as $D_{10}$.

10. A surface-coated flame-retardant particle produced by the method of claim 3.

11. A surface-coated flame-retardant particle produced by the method of claim 4.

12. A surface-coated flame-retardant particle produced by the method of claim 5.

13. A surface-coated flame-retardant particle produced by the method of claim 6.

14. A surface-coated flame-retardant particle produced by the method of claim 7.

15. A surface-coated flame-retardant particle produced by the method of claim 8.

16. A surface-coated flame-retardant particle produced by the method of claim 9.

17. A method of producing a flame-retardant resin composition, the method comprising:

mixing at least a matrix resin and surface-coated flame-retardant particles; and kneading the mixture by using at least one kneading machine selected from rolls, a kneader, a Banbury mixer, an intermixer, a uniaxial extruder, and a biaxial extruder, wherein the surface-coated flame-retardant particles each comprise a flame-retardant grain and a coated layer provided on the flame-retardant grain, the coated layer comprises an organic compound or a polysilicone, the flame-retardant grains comprise a complex metal hydrate and have a volume average particle diameter of 1 to 500 nm, and the complex metal hydrate is represented by $MgM_x\text{-}(OH)_y$, wherein M represents one or more metals selected from the group consisting of Ca, Al, Fe, Zn, Ba, Cu, and Ni, x is a real number of 0.1 to 10, and y is an integer of 2 to 32; and wherein the surface-coated flame-retardant particles have a degree of dispersion from 0.1 to 3.0, the degree of dispersion being defined by the following Formula (1):

$$\text{Degree of dispersion} = \log(D_{90}/D_{10})$$

where:

in a plot of a mass weighted cumulative distribution of the particles against particle weight from the smaller particle diameter side, the particle diameter at which the cumulative distribution reaches the 90% point is designated as $D_{90}$; and the particle diameter at which the cumulative distribution reaches the 10% point is designated as $D_{10}$.

18. The surface-coated flame-retardant particle of claim 1, wherein the surface-coated flame-retardant particles have a degree of dispersion from 0.1 to 1.0.

19. The surface-coated flame-retardant particle of claim 1, wherein the surface-coated flame-retardant particles have a degree of dispersion from 0.1 to 0.8.

20. The flame-retardant resin composition of claim 2, wherein the surface-coated flame-retardant particles have a degree of dispersion from 0.1 to 1.0.

21. The flame-retardant resin composition of claim 2, wherein the surface-coated flame-retardant particles have a degree of dispersion from 0.1 to 0.8.

* * * * *